United States Patent
Nagano et al.

(10) Patent No.: US 6,197,273 B1
(45) Date of Patent: Mar. 6, 2001

(54) METHOD FOR PRODUCING FINE SPHERICAL PARTICLES OF CARBONATE OR HYDROXIDE OF NICKEL, COBALT OR COPPER

(75) Inventors: Kazuhiko Nagano; Kazunobu Abe; Shigefumi Kamisaka; Kiyoshi Fukai; Tsutomu Hatanaka; Shinji Ohgama; Hiroshi Nakao; Minoru Yoneda; Hideto Mizutani, all of Sakai (JP)

(73) Assignee: Sakai Chemical Industry Co., Ltd., Osaka (JP)

(*) Notice: Subject to any disclaimer, the term of this patent is extended or adjusted under 35 U.S.C. 154(b) by 0 days.

(21) Appl. No.: 09/463,021
(22) PCT Filed: May 19, 1999
(86) PCT No.: PCT/JP99/02634
§ 371 Date: Mar. 22, 2000
§ 102(e) Date: Mar. 22, 2000
(87) PCT Pub. No.: WO99/59921
PCT Pub. Date: Nov. 25, 1999

(30) Foreign Application Priority Data

May 21, 1998 (JP) .................................................. 10-139683
Dec. 14, 1998 (JP) .................................................. 10-354188

(51) Int. Cl.[7] ........................... C01B 31/24; C01B 13/14; C01G 3/02
(52) U.S. Cl. ................. 423/419.1; 423/592; 423/604
(58) Field of Search ............................. 423/419.1, 592, 423/604, 27, 35, 42, 143, 144, 150.1

(56) References Cited

U.S. PATENT DOCUMENTS

| | | | |
|---|---|---|---|
| 4,105,743 | * 8/1978 | Reinhardt et al. | 423/144 |
| 4,999,323 | * 3/1991 | Sang et al. | 423/600 |
| 5,278,106 | * 1/1994 | Nakashima et al. | 501/12 |

FOREIGN PATENT DOCUMENTS

| | | |
|---|---|---|
| 53-021099 | * 2/1978 | (JP) . |
| 53-017787 | 2/1978 | (JP) . |
| 1-301502 | 12/1989 | (JP) . |
| 2-059432 | 2/1990 | (JP) . |

* cited by examiner

*Primary Examiner*—Steven Bos
(74) *Attorney, Agent, or Firm*—Wenderoth, Lind & Ponack, L.L.P.

(57) ABSTRACT

The invention provides a process for production of fine spherical particles of a carbonate or a hydroxide of nickel, cobalt or copper which comprises: dissolving a carbonate or a hydroxide of nickel, cobalt or copper having the general formula (I)

$$M(CO_3)_{x/2} \cdot (OH)_y$$

wherein M represents Ni, Co or Cu, and x and y are numerals satisfying the followings: $0 \leq x \leq 2$, $0 \leq y \leq 2$ and $x+y=2$, in aqueous ammonia, converting the resulting solution to a W/O emulsion containing droplets of the solution in a non-aqueous medium, and then removing volatile components including ammonia from within the droplets, thereby precipitating a basic carbonate or a hydroxide of a metal selected from nickel, cobalt and copperin the droplets.

The fine spherical particles of a carbonate or a hydroxide of nickel, cobalt or copper obtained according to the process of the invention are especially useful as a precursor for the manufacture of uniform, fine spherical particles of nickel, copper or cobalt metal, as well as useful as themselves as a catalyst for use in organic synthesis, a carrier, a pigment, a filler or a glaze.

14 Claims, 27 Drawing Sheets

METHOD FOR PRODUCING FINE SPHERICAL PARTICLES OF CARBONATE OR HYDROXIDE OF NICKEL, COBALT OR COPPER

FIELD OF THE INVENTION

This invention relates to a process for production of fine spherical particles of a carbonate or a hydroxide of an element selected from nickel, cobalt and copper. More particularly, the invention relates to a process for production of fine spherical particles of a carbonate or a hydroxide of an element selected from nickel, cobalt and copper which are especially useful as a precursor for the manufacture of uniform and fine spherical particles of a metal selected from nickel, copper and cobalt, as well as useful as themselves as a catalyst for use in organic synthesis, a carrier, a pigment, a filler or a glaze.

DESCRIPTION OF PRIOR ART

By way of an example, particles of nickel carbonate are generally known as a fine amorphous or non-spherical powder although it is also known that fine spherical particles of nickel carbonate can be produced by a method in which a W/O emulsion is used as a reaction field, as described in Japanese Patent Application Laid-open No. 2-59432.

Accordingto this method, an aqueous solution of water-soluble nickel salt such as nickel chloride is added to a non-aqueous medium together with a surfactant, and the resulting mixture is stirred, thereby to prepare a W/O emulsion. Then, an aqueous solution of a carbonate or a hydrogencarbonate of an alkali metal is added as a Attachment A neutralizer to the emulsion so that the nickel salt in the solution in the form of droplets is reacted with the neutralizer, thereby to form fine spherical particles of nickel carbonate.

However, according to the method as mentioned above in which an emulsion is used as a reaction field, the emulsion is easily broken not only on account of the neutralizer used but also on account of the salts by-produced when the water-insoluble nickel salt is formed. Therefore, it is difficult to maintain the reaction field stable throughout the reaction and hence it is difficult to obtain fine spherical particles of nickel carbonate in a stable manner.

Even if the method provides fine spherical particles of nickel salt, it is not possible to obtain fine spherical particles of nickel metal since it is difficult to maintain the spherical form of the particles during the process for oxidizing and reducing the nickel salt thus obtained.

The invention has been completed to solve the foregoing problems involved in the production of fine spherical particles of a carbonate or a hydroxide of nickel, cobalt or copper. Therefore, it is an object of the invention to provide a process for production of fine spherical particles of a carbonate or a hydroxide of nickel, cobalt or copper.

SUMMARY OF THE INVENTION

The invention provides a process for production of fine spherical particles of a carbonate or a hydroxide of nickel, cobalt or copper which comprises: dissolving a carbonate or a hydroxide of nickel, cobalt or copper having the general formula (I)

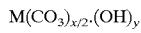

wherein M represents Ni, Co or Cu, and x and y are numerals satisfying the followings: $0 \leq x \leq 2$, $0 \leq y \leq 2$ and $x+y=2$, in aqueous ammonia, converting the resulting solution to a W/O emulsion containing droplets of the solution in a non-aqueous medium, and then removing volatile components including ammonia from within the droplets, thereby precipitating a basic carbonate or a hydroxide of nickel, cobalt or copper in the droplets.

DESCRIPTION OF PREFERRED EMBODIMENTS

Figure 1:
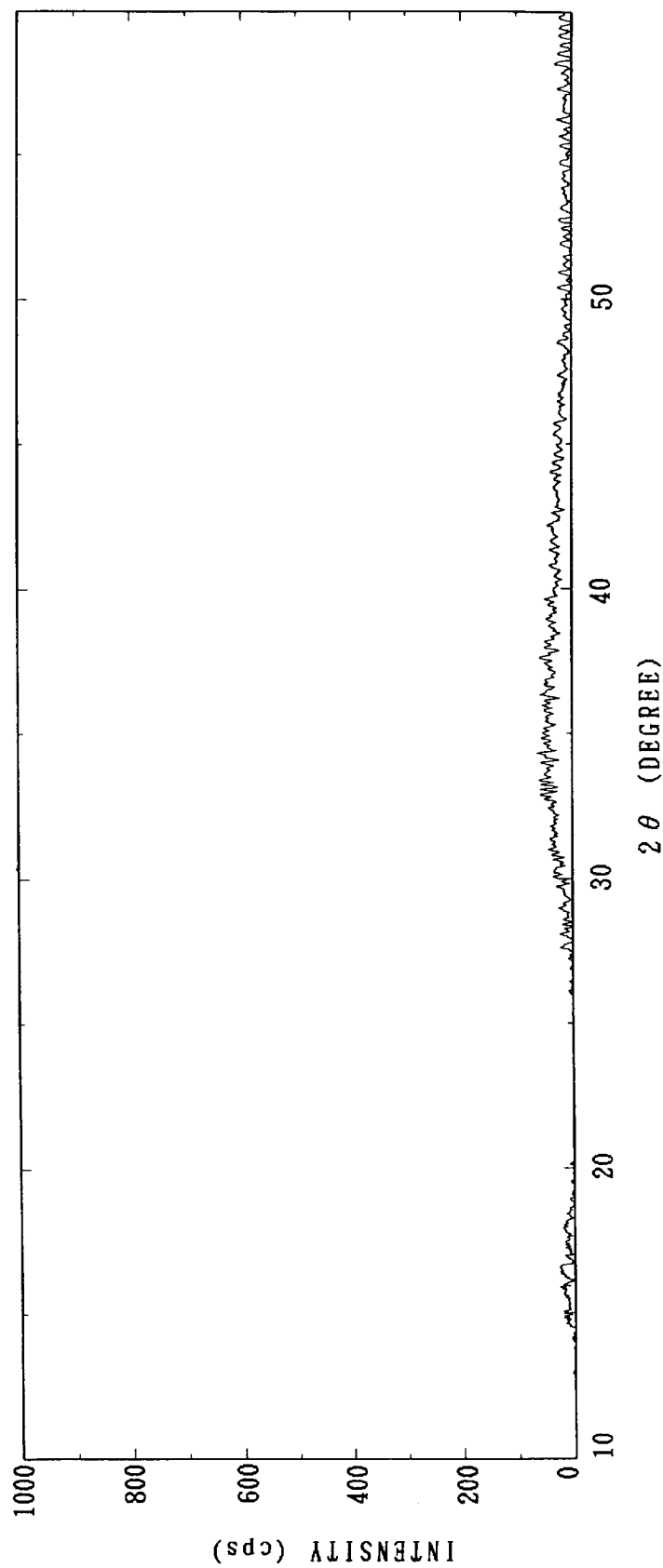
FIG. 1 is an X-ray diffraction diagram of particles of basic nickel carbonate obtained in Example 1 according to the invention.

According to the invention, there are obtained fine spherical particles of a carbonate or a hydroxide of nickel, cobalt or copper by dissolving a carbonate or a hydroxide of nickel, cobalt or copper having the general formula (I)

$$M(CO_3)_{x/2} \cdot (OH)_y$$

wherein M represents Ni, Co or Cu, and x and y are numerals satisfying the followings: $0 \leq x \leq 2$, $0 \leq y \leq 2$ and $x+y=2$, in aqueous ammonia, converting the resulting solution to a W/O emulsion containing droplets of the solution in a non-aqueous medium, removing volatile components including ammonia from within the droplets to precipitate a basic carbonate or a hydroxide of nickel, cobalt or copper in the droplets, and then recovering the precipitates or products by a suitable means.

In the above general formula (I), M represents Ni, Co or Cu, and x and y are numerals satisfying the followings: $0 \leq x \leq 2$, $0 \leq y \leq 2$ and $x+y=2$. Thus, according to the invention, a carbonate or a hydroxide of nickel, cobalt or copper is used as a starting material, and the carbonate herein the invention includes a normal carbonate ($MCO_3$) and a basic carbonate ($xMO \cdot yCO_2 \cdot zH_2O$). The carbonate may contain hydroxides. The letter M represents nickel, cobalt or copper, as mentioned above.

Further according to the invention, the starting material is not limited to a carbonate or a hydroxide of a single element, but it may be a mixture of carbonates or hydroxides of two or more of elements of nickel, cobalt and copper.

If necessary, the starting material may contain elements other than nickel, cobalt or copper. The starting material may further contain trivalent nickel ions as well as calcium, cerium, yttrium or iron ions so long as they do not hinder the formation of an emulsion described hereafter.

According to the invention, a carbonate or a hydroxide of nickel, cobalt or copper is dissolved in aqueous ammonia, and the resulting solution is converted into a W/O emulsion containing droplets of the solution in a non-aqueous medium.

Then, a carbonate or a hydroxide of nickel, cobalt or copper is precipitated in the droplets in the emulsion either by removing volatile components including ammonia from within the droplets or by adding an acid to the emulsion and neutralizing the droplets.

When a carbonate is used as a starting material, the same carbonate is obtained as a product. That is, when a carbonate is used as a starting material and it is dissolved either in aqueous ammonia or an aqueous basic solution containing ammonia and other basic compounds, the same carbonate as the starting material is obtained as a product.

However, when a hydroxide is used as a starting material, the product obtained depends on the reaction conditions used. More specifically, when a hydroxide is dissolved in an aqueous solution containing ammonium carbonate, ammonium hydrogencarbonate or, a carbonate or a hydrogencarbonate (or bicarbonate) of an alkali metal (hereunder referred to as a (hydrogen)carbonate for simplicity), the resulting product is the corresponding carbonate. However, when a hydroxide is dissolved in aqueous ammonia which contains no (hydrogen)carbonate, the resulting product is the same hydroxide as the starting material.

Among the various embodiments of the invention as described above, it is preferred that a carbonate is used as a starting material and it is dissolved either in aqueous ammonia or in aqueous ammonia containing other basic compounds. The resulting solution is then, as mentioned hereinbefore, is converted to a W/O emulsion containing droplets of the solution in a non-aqueous medium, and then volatile components including ammonia are removed from within the droplets, thereby precipitating a basic carbonate or a hydroxide of nickel, cobalt or copper as fine spherical particles in the droplets. This embodiment is most preferredd in the invention.

In particular, it is preferred that nickel carbonate is dissolved in an aqueous solution of ammonium hydrogencarbonate or ammonium carbonate at a pH in the range of 8.0 to 11.5 together with ammonia. The resulting solution is mixed with a non-aqueous medium to prepare a W/O emulsion, and suction is applied to the emulsion under a reduced pressure to evaporate volatile components (such as carbon dioxide or water) containing ammonia, thereby precipitating nickel carbonate in the droplets of the solution in the emulsion. The precipitates are recovered as fine spherical particles of nickel carbonate.

The carbonate or hydroxide of nickel, cobalt or copper used as a starting material may be produced in any method. For example, a carbonate may be produced by neutralizing an inorganic salt such as a chloride, a sulfate, a nitrate or an organic acid salt such as an acetate with an alkali carbonate which contains carbonate ions such as sodium carbonate or ammonium carbonate.

An aqueous ammonia solution in which a carbonate or a hydroxide of nickel, cobalt or copper is dissolved therein may be prepared by dissolving an inorganic salt of the element such as a chloride, a sulfate, a nitrate or an organic acid salt of the element such as an acetate, or by reacting such salts with ammonia.

It is preferred that aqueous ammonia used in which the starting material, or a carbonate or a hydroxide of nickel, cobalt or copper, is dissolved, contains a basic compound (other than ammonia) in addition to ammonia, the basic compound other than ammonia being referred to as the second basic compound. The second basic compound is at least one of the (hydrogen)carbonates (i.e., ammonium carbonates, ammonium hydrogencarbonates, alkali metal carbonates and alkali metal hydrogencarbonates), alkali metal hydroxides and organic amines.

The above-mentioned alkali metal is preferably, for example, lithium, potassium or sodium. Accordingly, the alkali metal carbonate, alkali metal hydrogencarbonate or alkali metal hydroxide may be exemplified by, for example, lithium carbonate, lithium hydrogencarbonate, potassium carbonate, potassium hydrogencarbonate, sodium carbonate, sodium hydrogencarbonate, lithium hydroxide, potassium hydroxide or sodium hydroxide. The organic amine usable includes, for example, mono-, di- or trialkylamines, or mono-, di- or trialkanolamines, although the organic amines usable are not limited to these examples. Among these second basic compounds, ammonium hydrogencarbonate is most preferred.

Thus, according to a preferred embodiment of the invention, nickel carbonate is dissolved in aqueous ammonia containing a second basic compound, and the resulting solution is converted to a W/O emulsion containing droplets of the solution in a non-aqueous medium. The droplets contain the nickel salt therein. Then, nickel carbonate is precipitated in the droplets by removing volatile components including ammonia (mainly composed of ammonia and carbon dioxide) from within the droplets. If necessary, a further volatile component mainly composed of water is removed from within the droplets to dry the nickel carbonate in the emulsion. The thus formed nickel carbonate is separated by, for example, centrifugation, washed and dried to provide desired fine spherical particles of nickel carbonate.

In the same way, nickel hydroxide is dissolved in aqueous ammonia containing a (hydrogen)carbonate as a preferred second basic compound, and the resulting solution of nickel salt is converted to a W/O emulsion containing droplets of the solution in a non-aqueous medium. The droplets contain the nickel salt therein. Then, nickel carbonate is precipitated in the droplets by evaporating volatile components including ammonia (mainly composed of ammonia and carbon dioxide) from within the droplets. If necessary, a further volatile component mainly composed of water is evaporated from within the droplets to dry the nickel carbonate in the emulsion. The thus obtained nickel carbonate is separated by, for example, centrifugation, washed and dried to provide desired fine spherical particles of nickel carbonate.

On the other hand, nickel hydroxide is dissolved in aqueous ammonia and the resulting solution is converted to a W/O emulsion containing droplets of the solution in a non-aqueous medium. Then, nickel hydroxide is precipitated in the droplets by evaporating ammonia from within the droplets. If necessary, water is further evaporated to dry the nickel hydroxide in the emulsion. The thus obtained nickel hydroxide is separated by, for example, centrifugation, washed and dried to provide desired fine spherical particles of nickel hydroxide.

Referring now to the case in which nickel carbonate is used as a starting material, the invention will be described in detail. When not specifically indicated, the description is also applicable to cobalt carbonate, copper carbonate, nickel hydroxide, cobalt hydroxide and copper hydroxide.

According to the invention, it is preferred that nickel carbonate is dissolved in an aqueous ammonia solution at a pH in the range of 8.0 to 11.5, although not limited thereto. Thereupon it is easy to adjust the pH of the aqueous solution in which nickel carbonate is dissolved by using a second basic compound as mentioned hereinbefore together with ammonia as a basic material, especially by using a (hydrogen)carbonate. It is also easy to dissolve nickel carbonate in the solution when a second basic compound is used together with ammonia.

The concentration of the aqueous solution of the nickel salt prepared by dissolving nickel carbonate in aqueous ammonia is not specifically limited, but it is usually in the range of 1 mol/L to the saturated concentration, and preferably in the range of 0.3 to 1.2 mol/L.

The thus prepared aqueous solution of the nickel salt is then mixed with a non-aqueous medium and stirred in the presence of a surfactant to prepare an emulsion in a conventional manner per se well known. It is preferred that a more hydrophilic surfactant is added to the aqueous solution of the nickel salt and, if necessary, the solution is heated to a temperature less than 50° C. so that ammonia does not evaporate and the surfactant is dissolved in the solution.

On the other hand, it is preferred that a more lipophilic surfactant is added to the non-aqueous medium, and if necessary, the non-aqueous medium is heated to dissolve the surfactant therein.

Usually a W/O emulsion is prepared by gradually adding the aqueous solution of the nickel salt to the non-aqueous medium while stirring the non-aqueous medium using a disperser so that fine droplets of the aqueous solution of the nickel salt are dispersed, thereby providing a W/O emulsion.

The average particle size and particle size distribution of the spherical particles of nickel carbonate finally obtained are controllable by suitably adjusting the average particle size and particle size distribution of the water phase (droplets) in the emulsion, or concentration of aqueous solution of the nickel salt. In turn, the average particle size and particle size distribution of the water phase (droplets) in the emulsion are controllable by combination of the surfactants used and the amounts thereof, type of disperser used and stirring rate employed. In this manner, the average particle size of particles obtained is controllable in the range of 0.1 to 100 $\mu$m, preferably in the range of 0.1 to 50 $\mu$m.

According to a preferred embodiment of the invention, uniform, fine and spherical particles of carbonate or hydroxide of nickel, cobalt or copper are obtained by controlling or adjusting the average particle size and particle size distribution of the water phase (droplets) in the emulsion.

The non-aqueous medium in which the emulsion is prepared is preferably water-insoluble and, not volatile or only slightly volatile and, thus stable when being treated under a reduced or the normal pressure mentioned hereafter. Accordingly, for example, a non-aqueous medium that has a solubility in water is not more than 5% and has a boiling point higher than that of water is preferred.

Examples of such non-aqueous media include aliphatic hydrocarbons such as n-octene, isooctene, squalan or kerosene, alicyclic hydrocarbons such as cyclooctane, cyclononane or cyclodecane, aromatic hydrocarbons such as toluene, ethylbenzene, isopropylbenzene, cumene, mesitylene or tetralin, ethers such as butyl ether or isobutyl ether, halogenated hydrocarbons such as dichloropentanes, and aliphatic carboxylic acid esters such as n-propyl acetate, n-butyl acetate, isobutyl acetate, n-amyl acetate, isoamyl acetate, isobutyl propionate, ethyl butyrate and butyl butyrate, and a mixture of two or more of these.

In addition to the above, there may be mentioned as examples of non-aqueous media usable in the invention, natural oils such as mineral oil or, animal or vegetable oils, and synthetic oils such as hydrocarbon oil, ester oil, ether oil, fluorine-containing lubricant, phosphorus fluorine-containing lubricant or silicon-lubricant.

In particular, according to the invention, when nickel carbonate or nickel hydroxide is precipitated in the droplets by evaporating volatile components including ammonia from within the droplets in the emulsion, a hydrocarbon solvent which is water-insoluble and has a small vaporization pressure is preferably used as a non-aqueous medium, such as, for example, an aliphatic hydrocarbon solvent having a boiling point of not less than 100° C. under the normal pressure. However, when nickel carbonate or nickel hydroxide is precipitated in the droplets in the emulsion by neutralizing the ammonia in the droplets by adding an acid to the emulsion, as described hereafter, there is no need to use such a non-aqueous medium that has a low vaporization pressure, but there can be used a non-aqueous medium that has a low boiling point.

The surfactant used for preparing an emulsion is chosen depending on the individual non-aqueous medium used. Although not limited, a stable W/O emulsion may be prepared as follows. A hydrophilic surfactant having a hydrophile-lypophile balance (HLB) value of not less than 10 is dissolved in the aqueous solution (water phase) of the nickel salt while a lypophilic surfactant having an HLB value of not more than 10 is dissolved in the non-aqueous medium (oil phase), and the water phase and oil phase are mixed together in order to obtain a stable emulsion.

The amount of surfactant used is determined depending on a water/oil ratio (W/O ratio) employed and a desired particle size of the droplets in the resulting emulsion.

Although not limited, it is not more than 20% by weight, preferably in the range of 5 to 15% by weight, based on the weight of the emulsion. As hereafter described, when surfactants are dissolved in both of the water phase and the oil phase, a first surfactant is dissolved in the water phase in an amount of not more than 20% by weight, preferably in an amount of 0.5 to 15% by weight, based on the amount of the water phase while a second surfactant is dissolved in the oil phase in an amount of not more than 20% by weight, preferably in an amount of 0.5 to 15% by weight, based on the amount of the oil phase.

The W/O ratio in the emulsion depends on the individual non-aqueous medium used and its properties, especially its viscosity, as well as on the individual surfactant used and its properties, especially its HLB value. However, it is usually in the range of 3/2 to 1/10, preferably 1/1 to 1/5, and most preferably 1/3 to 1/5, although not limited thereto.

Nonionic surfactants having an HLB value of not less than 10 used for the preparation of emulsion include, for example, polyoxyethylene sorbitan fatty acid esters such as polyoxyethylene sorbitan monolaurate, polyoxyethylene sorbitan monolpalmitate, polyoxyethylene sorbitan monostearate, polyoxyethylene sorbitan tristearate, polyoxyethylene sorbitan monooleate or polyoxyethylene sorbitan trioleate, polyoxyethylene fatty acid esters such as polyethylene glycol monolaurate, polyethylene glycol monostearate, polyethylene glycol distearate or polyethylene glycol monooleate, polyoxyethylene higher alkyl ethers such as polyoxyethylene lauryl ether, polyoxyethylene cetyl ether, polyoxyethylene stearyl ether or polyoxyethylene oleyl ether, polyoxyethylene higher alkyl aryl ethers such as polyoxyethylene octylphenyl oleyl ether or polyoxyethylene nonylphenyl ether.

Nonionic surfactants having an HLB value of not more than 10 used for the preparation of emulsion include, for example, sorbitan fatty acid esters such as sorbitan monolaurate, sorbitan monopalmitate, sorbitan monostearate, sorbitan distearate, sorbitan tristearate, sorbitan monooleate or sorbitan trioleate, and glycerin fatty acid esters such as glycerin monostearate or glycerin monooleate.

As set forth above, as one aspect of the invention, fine spherical particles of nickel carbonate is obtained. That is, nickel carbonate or nickel hydroxide is dissolved in aqueous ammonia containing a (hydrogen)carbonate and the resulting solution of the nickel salt is dispersed in the form of droplets of the solution in a non-aqueous medium to prepare a W/O emulsion. The emulsion is then subjected to stirred or aerated under the normal pressure, if necessary with heating, or suction is applied to the emulsion under a reduced pressure, to evaporate volatile components mainly comprising ammonia and carbon dioxide from within the droplets, thereby to precipitate the nickel salt in the droplets in the emulsion. If desired, further volatile components mainly comprising water are then evaporated from within the droplets to dry the nickel salt in the emulsion. The thus obtained nickel salt is then separated by, for example, centrifugation, washed and dried to provide the desired fine particles of nickel carbonate. This is also the case with cobalt carbonate, cobalt hydroxide, copper carbonate or copper hydroxide.

As a further aspect of the invention, fine spherical particles of nickel carbonate is also obtained as follows. That is, nickel carbonate or nickel hydroxide is dissolved in aqueous ammonia containing a (hydrogen)carbonate and the resulting solution of the nickel salt is dispersed in the form of droplets of the solution in a non-aqueous medium to prepare a W/O emulsion. The emulsion is then stirred or aerated under the normal pressure, if necessary with heating, or suction is applied to the emulsion under a reduced pressure, to evaporate volatile components mainly comprising ammonia and carbon dioxide from within the droplets, thereby to precipitate the nickel salt in the droplets in the emulsion. Then the thus formed spherical precipitates are separated by a suitable means, for example, by centrifugation or filtration, washed and dried, thereby providing the desired fine particles of nickel carbonate. This is also the case with cobalt carbonate, cobalt hydroxide, copper carbonate or copper hydroxide.

Meanwhile, fine spherical particles of nickel hydroxide is obtained as follows. That is, nickel hydroxide is dissolved in aqueous ammonia containing no (hydrogen)carbonate therein and the resulting solution is dispersed in the form of droplets of the solution in a non-aqueous medium to prepare a W/O emulsion. The emulsion is then stirred or aerated under the normal pressure, if necessary with heating, or suction is applied to the emulsion under a reduced pressure, to evaporate volatile components mainly comprising ammonia and carbon dioxide from within the droplets, thereby to precipitate nickel hydroxide in the droplets in the emulsion. If desired, further volatile components mainly comprising water are then evaporated from within the droplets to dry the nickel hydroxide in the emulsion. The thus obtained nickel hydroxide is then separated by, for example, centrifugation, washed and dried, thereby providing the desired fine particles of nickel hydroxide. This is also the case with cobalt hydroxide or copper hydroxide.

As a still further aspect of the invention, as described with respect to the preparation of nickel carbonate, after nickel hydroxide is precipitated in the droplets in the emulsion, the emulsion is maintained as it is or it is destroyed, and then the nickel hydroxide is separated by, for example, centrifugation, washed and dried, thereby providing the desired fine particles of nickel hydroxide. This is also the case with cobalt hydroxide or copper hydroxide.

The emulsion is subjected to aeration usually at a temperature of not more than 100° C. under the normal pressure or the emulsion is subjected to suction under a reduced pressure to evaporate volatile components including ammonia from within the droplets in the emulsion, however, it is especially preferred that suction is applied to the emulsion with heating under a reduced pressure.

When suction is applied to the emulsion in this way, the temperature and pressure conditions are not specifically limited, but the pressure is usually under the atmospheric pressure, preferably under a reduced pressure (vacuum) of 400 mmHg or less, while the limit of the reduced pressure (vacuum) may be about 5 mmHg, although depending on economy of operation. The temperature may range from 0° C. to 90° C., and preferably from 10° C. to 80° C., and most preferably 20° C. to 70° C.

In particular, good results are obtained when suction is applied to the emulsion using an aspirator, and accordingly under a reduced pressure of about 10 to 50 mmHg, while the emulsion is heated at a temperature of 20° C. to 70° C. to evaporate volatile components such ammonia and others from within the droplets in the emulsion.

However, the emulsion may be simply stirred under the normal pressure to evaporate volatile components including ammonia from within the droplets of the solution of nickel salt in the emulsion. Alternately, air may be blown into the emulsion, i.e., the emulsion may be aerated under the normal pressure, if necessary with heating.

Further according to the invention, fine spherical particles of carbonate or hydroxide of nickel, cobalt or copper is obtained as follows. That is, a carbonate or a hydroxide of nickel, cobalt or copper is dissolved in aqueous ammonia (containing a second basic compound) and the resulting solution is dispersed as fine droplets in a nonaqueous medium to prepare an emulsion. An acid is then added to the emulsion to neutralize the droplets, more specifically ammonia in the droplets, thereby precipitating a carbonate or a hydroxide of nickel, cobalt or copper in the droplets.

The thus formed carbonate or hydroxide is dried in the emulsion as described hereinbefore and separated by, for example, centrifugation, washed and dried, thereby providing the desired fine spherical particles of carbonate or hydroxide of nickel, cobalt or copper.

Any inorganic acid or organic acid is usable in the above-mentioned method. Examples of inorganic acids include, for example, nitric acid, hydrochloric acid or sulfuric acid, and examples of organic acids include, for example, formic acid, oxalic acid, acetic acid, methanesulfonic acid, ethanesulfonic acid, benzenesulfonic acid or p-toluenesulfonic acid. Among these acids, however, an inorganic acid is preferred, and nitric acid is most preferred.

INDUSTRIAL AVAILABILITY OF THE INVENTION

As described hereinabove, according to the invention, a carbonate or a hydroxide of nickel, cobalt or copper is dissolved in aqueous ammonia and the resulting solution is converted to a W/O emulsion having droplets of the solution dispersed in a non-aqueous medium, and then volatile components containing ammonia are removed from within the droplets of the solution to precipitate a carbonate or hydroxide of nickel, cobalt or copper in the droplets in the emulsion, thus providing fine spherical particles of a carbonate or a hydroxide of nickel, cobalt or copper.

While hitherto commonly available nickel carbonate, for example, are in the form of amorphous or non-spherical particles, a carbonate or a hydroxide of nickel, cobalt or copper is obtained as fine spherical particles according to the invention. Accordingly, such fine spherical particles are useful as themselves as a catalyst for use in organic synthesis, a carrier for use in a catalyst, a pigment, a filler or a glazes.

Furthermore, such fine spherical particles of a carbonate or a hydroxide obtained according to the invention provide fine spherical particles of nickel, cobalt or copper metal when they are reduced if necessary after they are oxidized. Among these particles of metals, those of nickel are particularly useful as, for example, a material for inside electrodes of laminated ceramic capacitors.

EXAMPLES

The invention will now be described in more detail with reference to examples, but the invention is not limited to these examples.

Example 1

141 g of commercially available basic nickel carbonate ($NiCO_3 \cdot Ni(OH)_2 \cdot 4H_2O$, the same hereunder) and 242 g of ammonium hydrogencarbonate ($NH_4HCO_3$) were added to 15% aqueous ammonia and stirred to prepare an aqueous ammonia-ammonium hydrogencarbonate solution of basic nickel carbonate (1.1 mol/L in terms of Ni) having a pH of 9.5.

30 g of a nonionic surfactant, polyoxyethylene sorbitan monooleate having an HLB value of 15 (RHEODOL TW-0120, available from Kao Corp.) was added to 200 g of the solution of nickel salt and stirred at a temperature of 50° C. to dissolve the surfactant in the solution. Meanwhile, 50 g of a nonionic surfactant, sorbitan monooleate having an HLB value of 4.3 (RHEODOL SP-010, available from Kao Corp.) were added at a temperature of 80° C. to 800 g of a non-aqueous medium, squalan (Super Squalane, available from K.K. Squatech) having a boiling point of about 280° C. to dissolve the surfactant in the non-aqueous medium.

The aqueous solution of the nickel salt in which the surfactant was dissolved was mixed with the non-aqueous medium in which the surfactant was dissolved and the resulting mixture was stirred for 3 minutes using a homomixer (available from Tokushu Kika Kogyo K.K.) at 1500 rpm to prepare a W/O emulsion.

Suction was applied to the emulsion under a reduced pressure of 20 to 30 mmHg at a temperature of 50° C. and volatile components mainly comprising ammonia and carbon dioxide were evaporated to precipitate basic nickel carbonate in the droplets of the solution in the emulsion. Thereafter, further suction was applied to the emulsion under a reduce d pressure to evaporate volatile components mainly comprising water to dry the thus formed spherical particles of the nickel carbonate in the droplets.

Figure 2:
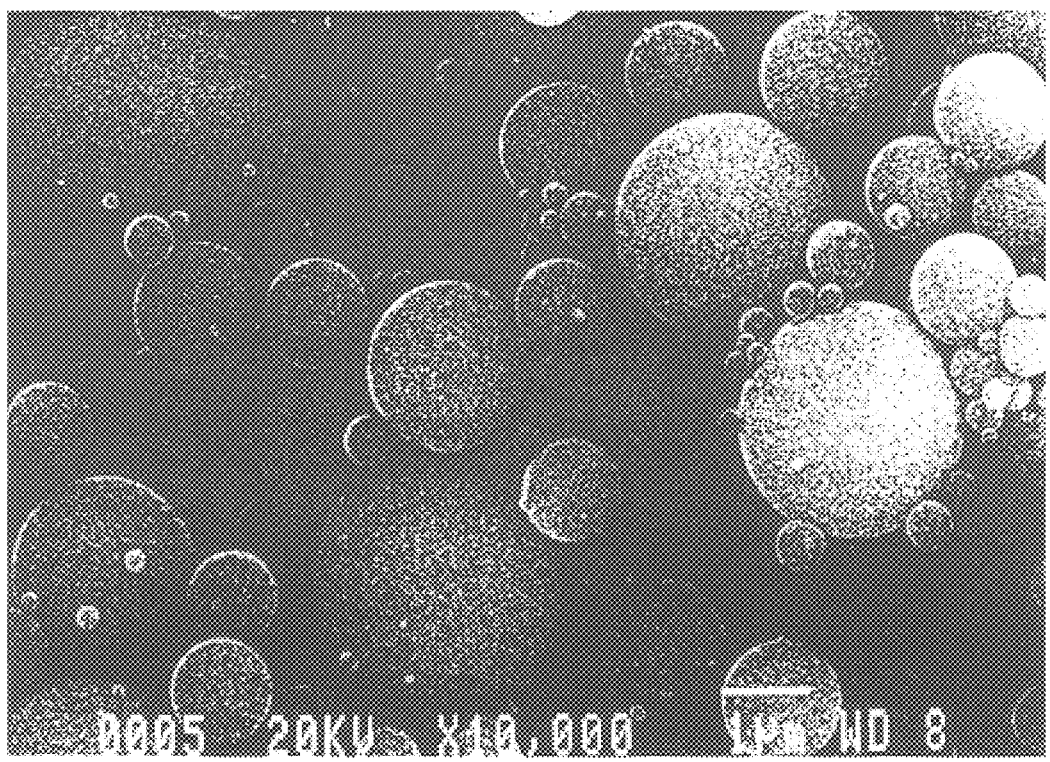
FIG. 2 is a scanning electron micrograph of particles of basic nickel carbonate obtained in Example 1.
Figure 3:
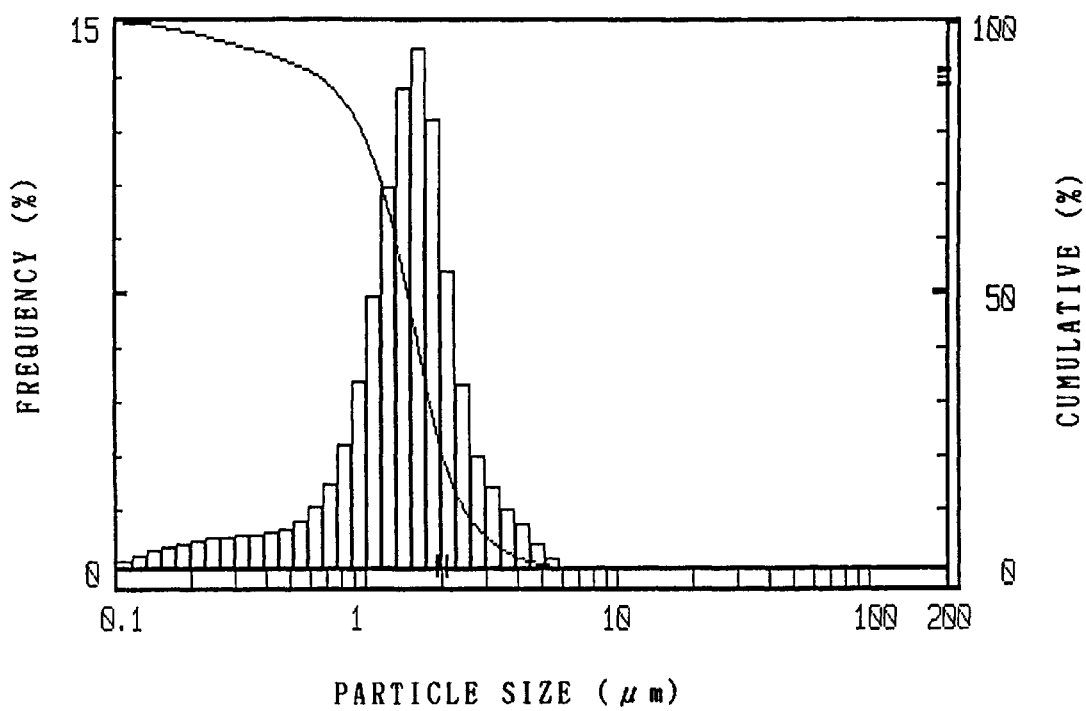
FIG. 3 is a particle size distribution diagram of particles of basic nickel carbonate obtained in Example 1.

The particle of the basic nickel carbonate were centrifuged, washed with hexane, methanol and water in this order, and dried at a temperature of 100° C. for 2 hours, thereby providing spherical particles of basic nickel carbonate having a particle size of 0.1 to 6 $\mu$m and an average particle size of 1.5 $\mu$m. It was confirmed by an X-ray diffraction diagram shown in FIG. 1 that the obtained particles were composed of basic nickel carbonate. FIG. 2 is a scanning electron micrograph and FIG. 3 is a particle size distribution diagram of the particles of the basic nickel carbonate, respectively.

Reference Example 1

The powder of the spherical particles of basic nickel carbonate obtained in Example 1 was heated at a rate of 50° C/hour and fired at a temperature of 600° C. for 2 hours in an air atmosphere to provide particles of nickel oxide.

It was confirmed by an X-ray diffraction measurement that the particles were composed of nickel oxide. The particles of the nickel oxide were heated at a rate of 100° C./hour in a hydrogen stream provided with at a flow rate of 3L/minute and heated at a temperature of 600° C. for one hour to reduce the oxide to provid fine spherical particles of nickel metal having a particle size of 0.1 to 5 $\mu$m and an average particle size of 1.3 $\mu$m.

Figure 4:
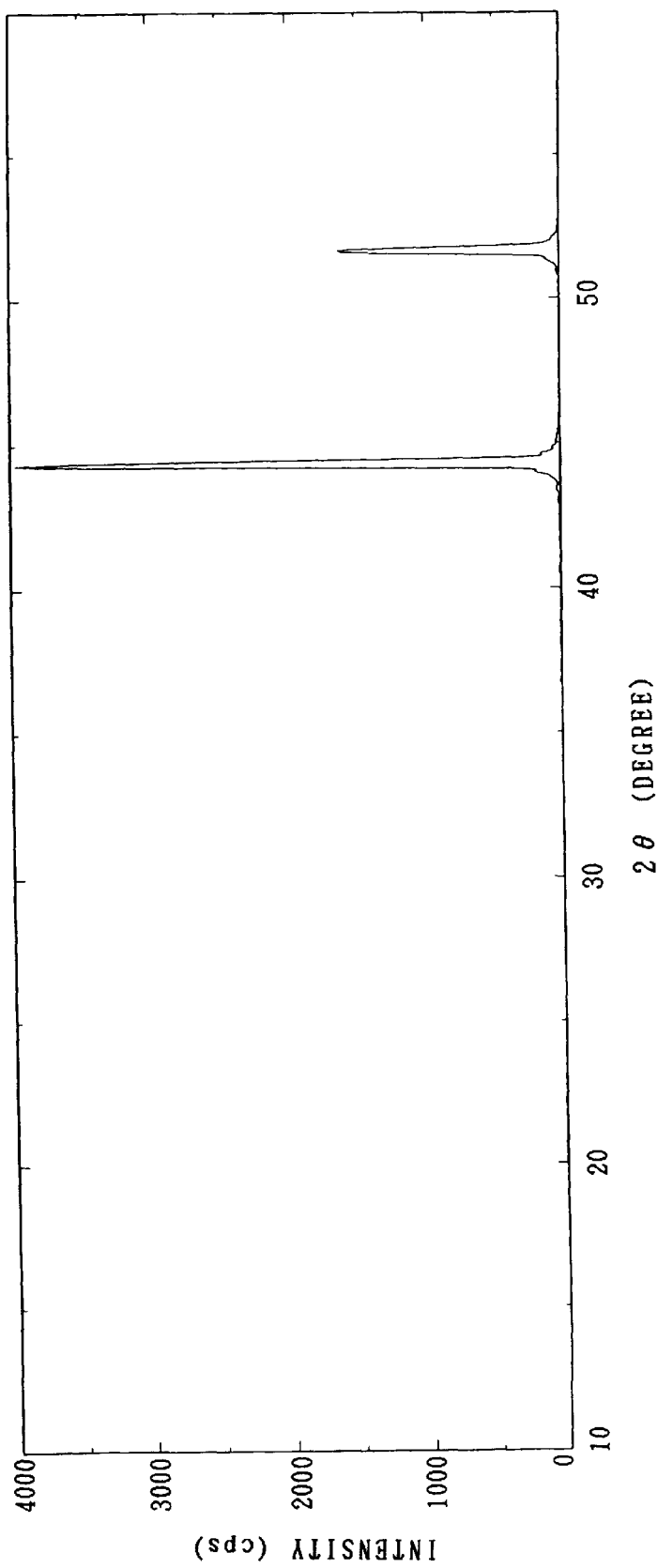
FIG. 4 is an X-ray diffraction diagram of fine spherical particles of nickel metal obtained by oxidizing basic nickel carbonate obtained in Example 1 and then heating and reducing the product in a hydrogen gas stream.
Figure 5:
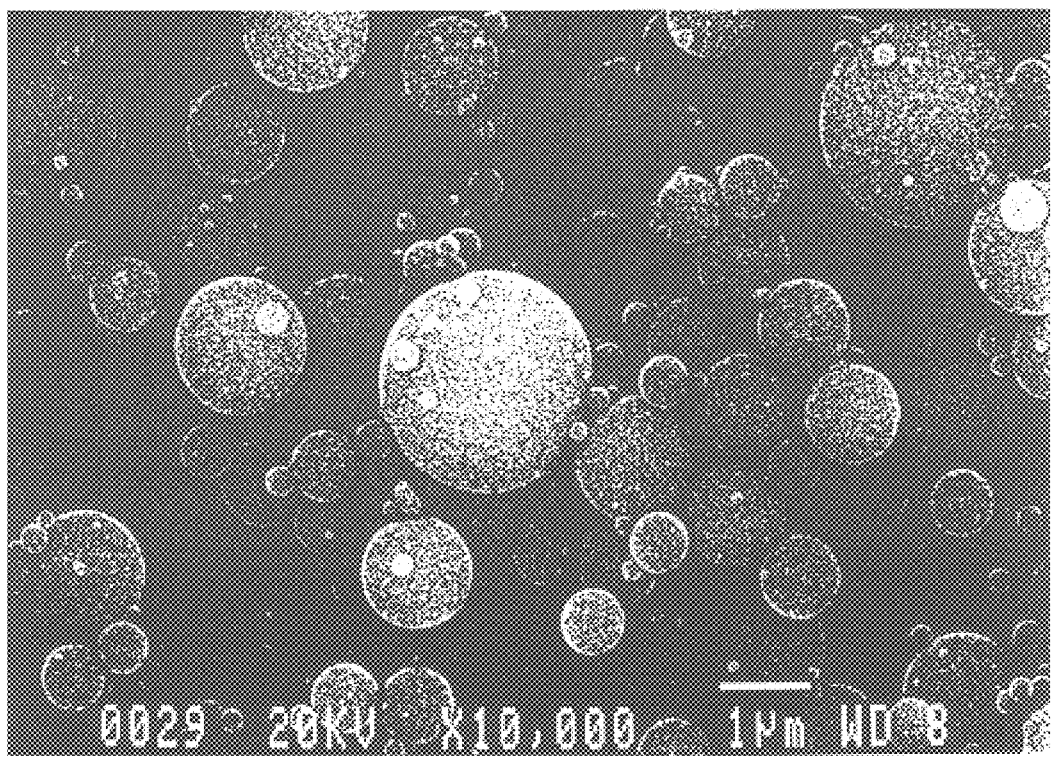
FIG. 5 is a scanning electron micrograph of fine particles of nickel metal shown in FIG. 4.
Figure 6:
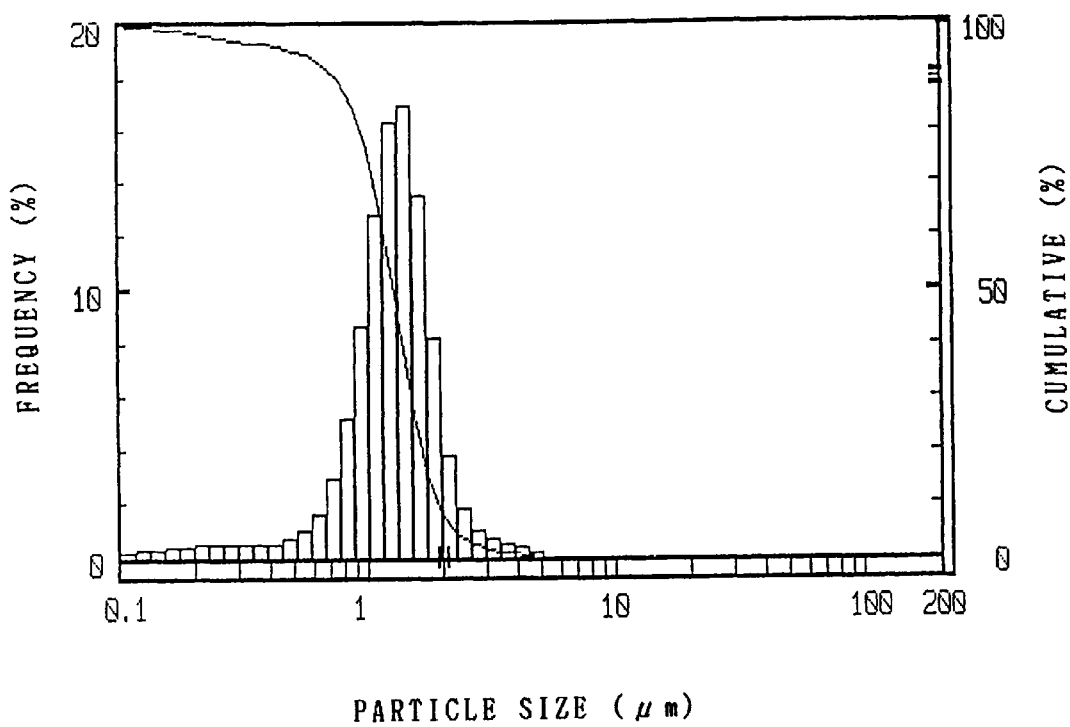
FIG. 6 is a particle size distribution diagram of fine particles of nickel metal shown in FIG. 4.

It was confirmed by an X-ray diffraction diagram shown in FIG. 4 that the particles were composed of nickel metal. FIG. 5 is a scanning electron micrograph and FIG. 6 is a particle size distribution diagram of the particles of the nickel metal, respectively.

Example 2

141 g of commercially available basic nickel carbonate and 331 g of ammonium hydrogencarbonate were added to 15% aqueous ammonia and stirred to prepare an aqueous ammonia-ammonium hydrogencarbonate solution of basic nickel carbonate (1.1 mol/L in terms of Ni) having a pH of 9.5. In the same manner as in Example 1 hereafter, spherical particles of basic nickel carbonate having a particle size of 0.1 to 5 $\mu$m and an average particle size of 1.3 $\mu$m were obtained.

Example 3

141 g of commercially available basic nickel carbonate and 331 g of ammonium carbonate were added to 15% aqueous ammonia and stirred to prepare an aqueous ammonia-ammonium carbonate solution of basic nickel carbonate (1.1 mol/L in terms of Ni) having a pH of 9.5. In the same manner as in Example 1, spherical particles of basic nickel carbonate having a particle size of 0.1 to 6 μm and an average particle size of 1.5 μm were obtained.

Example 4

141 g of commercially available basic nickel carbonate and 150 g of sodium hydroxide were added to 15% aqueous ammonia and stirred to prepare an aqueous ammonia-sodium hydroxide solution of basic nickel carbonate (1.1 mol/L in terms of Ni) having a pH of 10.0. In the same manner as in Example 1, spherical particles of basic nickel carbonate having a particle size of 0.1 to 10 μm and an average particle size of 1.4 μm were obtained.

Figure 7:
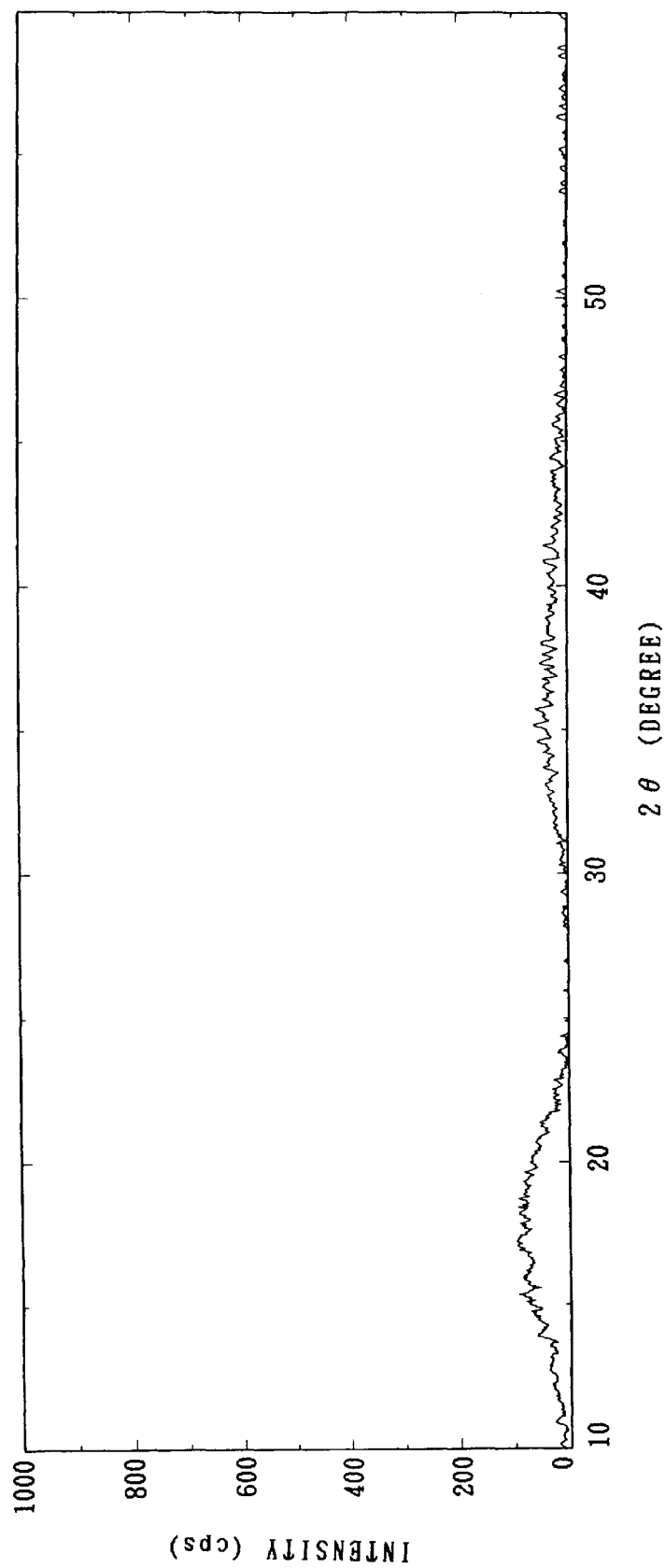
FIG. 7 is an X-ray diffraction diagram of particles of basic nickel carbonate obtained in Example 4.
Figure 8:
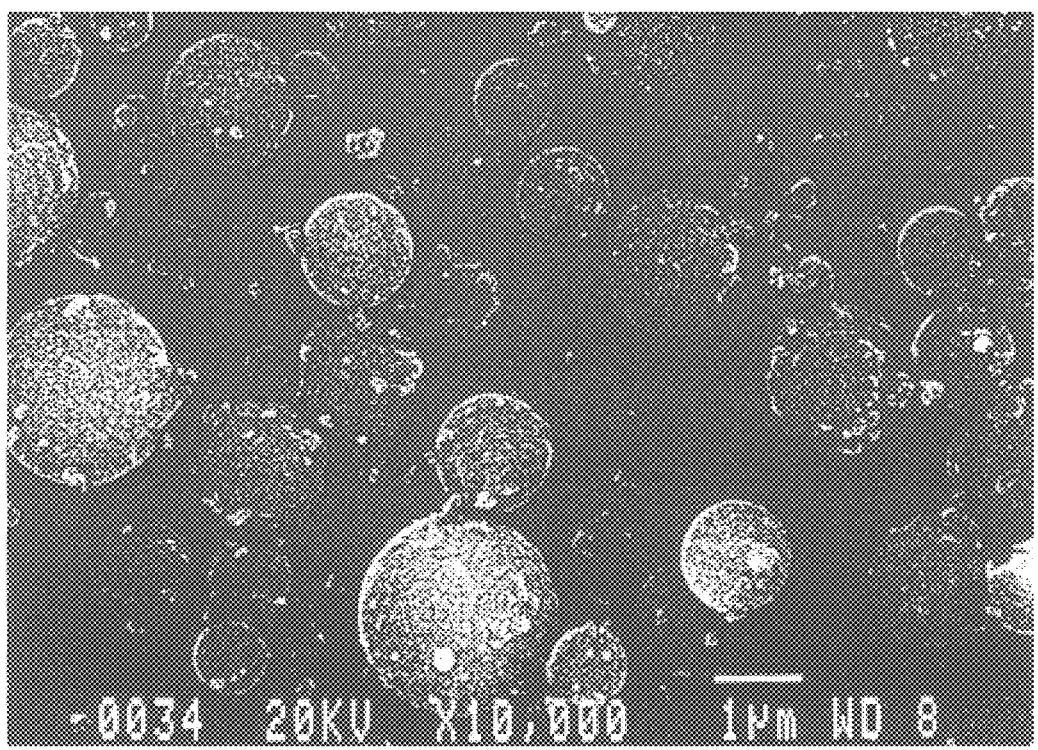
FIG. 8 is a scanning electron micrograph of fine particles of basic nickel carbonate obtained in Example 4.

It was confirmed by an X-ray diffraction diagram shown in FIG. 7 that the obtained particles were composed of basic nickel carbonate. FIG. 8 is a scanning electron micrograph of the particles of the basic nickel carbonate.

Example 5

141 g of commercially available basic nickel carbonate and 331 g of potassium hydrogencarbonate were added to 15% aqueous ammonia and stirred to prepare an aqueous ammonia-potassium hydrogencarbonate solution of basic nickel carbonate (1.1 mol/L in terms of Ni) having a pH of 9.5. In the same manner as in Example 1, spherical particles of basic nickel carbonate having a particle size of 0.1 to 6 μm and an average particle size of 1.5 μm were obtained.

Example 6

141 g of commercially available basic nickel carbonate and 331 g of potassium carbonate were added to 15% aqueous ammonia and stirred to prepare an aqueous ammonia-potassium carbonate solution of basic nickel carbonate (1.1 mol/L in terms of Ni) having a pH of 9.5. In the same manner as in Example 1, spherical particles of basic nickel carbonate having a particle size of 0.1 to 10 μm and an average particle size of 1.6 μm were obtained.

Example 7

141 g of commercially available basic nickel carbonate and 331 g of potassium hydroxide were added to 15% aqueous ammonia and stirred to prepare an aqueous ammonia-potassium hydroxide solution of basic nickel carbonate (1.1 mol/L in terms of Ni) having a pH of 9.5. In the same manner as in Example 1, spherical particles of basic nickel carbonate having a particle size of 0.1 to 7 μm and an average particle size of 1.6 μm were obtained.

Example 8

141 g of commercially available basic nickel carbonate and 331 g of lithium hydrogencarbonate were added to 15% aqueous ammonia and stirred to prepare an aqueous ammonia-lithium hydrogencarbonate solution of basic nickel carbonate (1.1 mol/L in terms of Ni) having a pH of 9.5. In the same manner as in Example 1, spherical particles of basic nickel carbonate having a particle size of 0.1 to 10 μm and an average particle size of 1.8 μm were obtained.

Example 9

141 g of commercially available basic nickel carbonate and 331 g of lithium carbonate were added to 15% aqueous ammonia and stirred to prepare an aqueous ammonia-lithium carbonate solution of basic nickel carbonate (1.1 mol/L in terms of Ni) having a pH of 9.5. In the same manner as in Example 1, spherical particles of basic nickel carbonate having a particle size of 0.1 to 6 μm and an average particle size of 1.5 μm were obtained.

Example 10

141 g of commercially available basic nickel carbonate and 150 g of lithium hydroxide were added to 15% aqueous ammonia and stirred to prepare an aqueous ammonia-lithium hydroxide solution of basic nickel carbonate (1.1 mol/L in terms of Ni) having a pH of 9.5. In the same manner as in Example 1, spherical particles of basic nickel carbonate having a particle size of 0.1 to 6 μm and an average particle size of 1.3 μm were obtained.

Example 11

141 g of commercially available basic nickel carbonate were added to 15% aqueous ammonia and stirred to prepare an aqueous ammonia solution of basic nickel carbonate (1.1 mol/L in terms of Ni) having a pH of 9.5. In the same manner as in Example 1, spherical particles of basic nickel carbonate having a particle size of 0.1 to 15 μm and an average particle size of 4.3 am were obtained.

Figure 9:
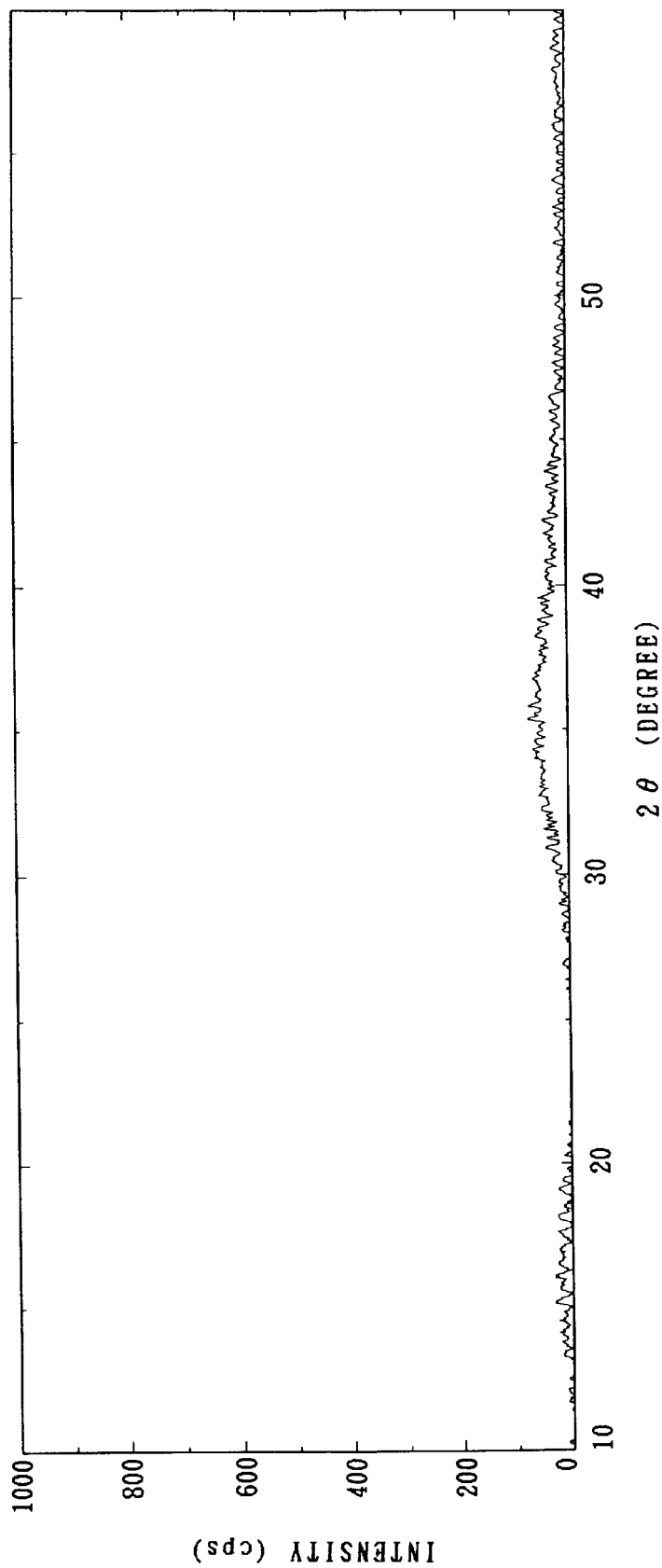
FIG. 9 is an X-ray diffraction diagram of particles of basic nickel carbonate obtained in Example 11.
Figure 10:
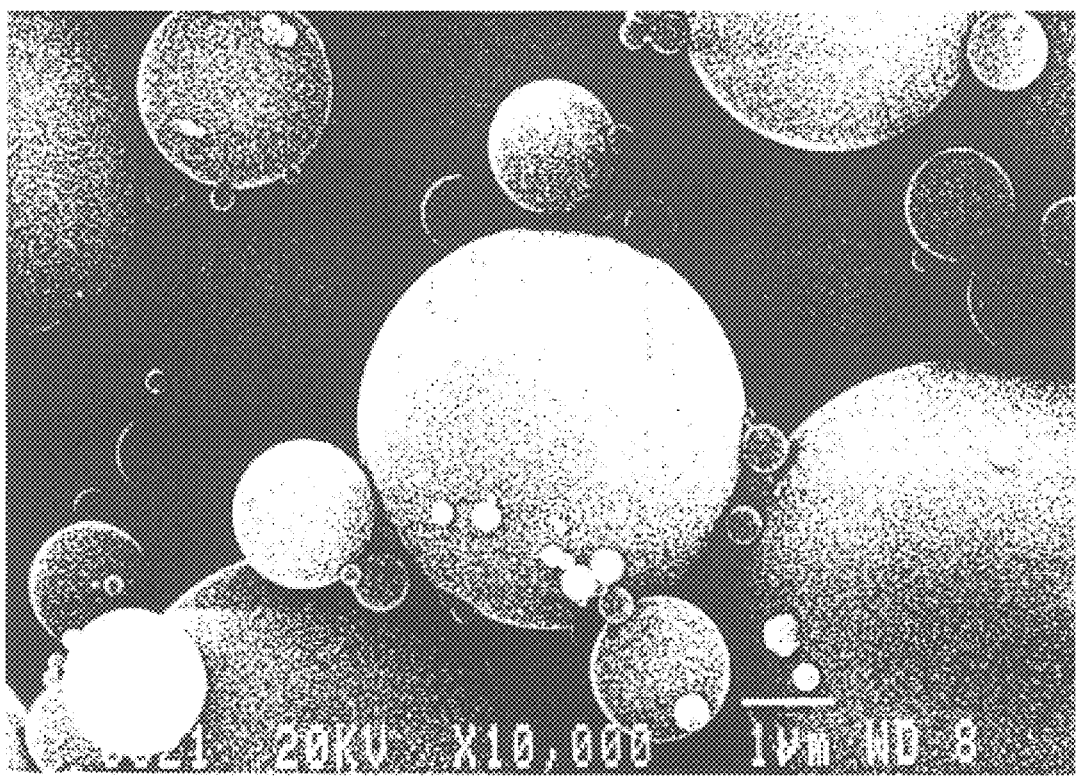
FIG. 10 is a scanning electron micrograph of fine particles of basic nickel carbonate obtained in Example 11.

It was confirmed by an X-ray diffraction diagram shown in FIG. 9 that the obtained particles were composed of basic nickel carbonate. FIG. 10 is a scanning electron micrograph of the particles of the basic nickel carbonate.

Example 12

141 g of commercially available basic nickel carbonate and 331 g of ammonium carbonate were added to 15% aqueous ammonia and stirred to prepare an aqueous ammonia-ammonium carbonate solution of basic nickel carbonate (1.1 mol/L in terms of Ni) having a pH of 9.5. In the same manner as in Example 1, spherical particles of basic nickel carbonate having a particle size of 0.1 to 10 μm and an average particle size of 2.6 μm were obtained.

Example 13

141 g of commercially available basic nickel carbonate and 662 g of 50% aqueous solution of ethylamine were added to 15% aqueous ammonia and stirred to prepare an aqueous ammonia-ethylamine solution of basic nickel carbonate (1.1 mol/L in terms of Ni) having a pH of 9.5. In the same manner as in Example 1, spherical particles of basic nickel carbonate having a particle size of 0.1 to 12 μm and an average particle size of 2.5 μm were obtained.

Example 14

141 g of commercially available basic nickel carbonate and 662 g of 50% aqueous solution of diethylamine were added to 15% aqueous ammonia and stirred to prepare an aqueous ammonia-diethylamine solution of basic nickel carbonate (1.1 mol/L in terms of Ni) having a pH of 9.5. In the same manner as in Example 1, spherical particles of basic nickel carbonate having a particle size of 0.1 to 26 μm and an average particle size of 2.0 μm were obtained.

Figure 11:
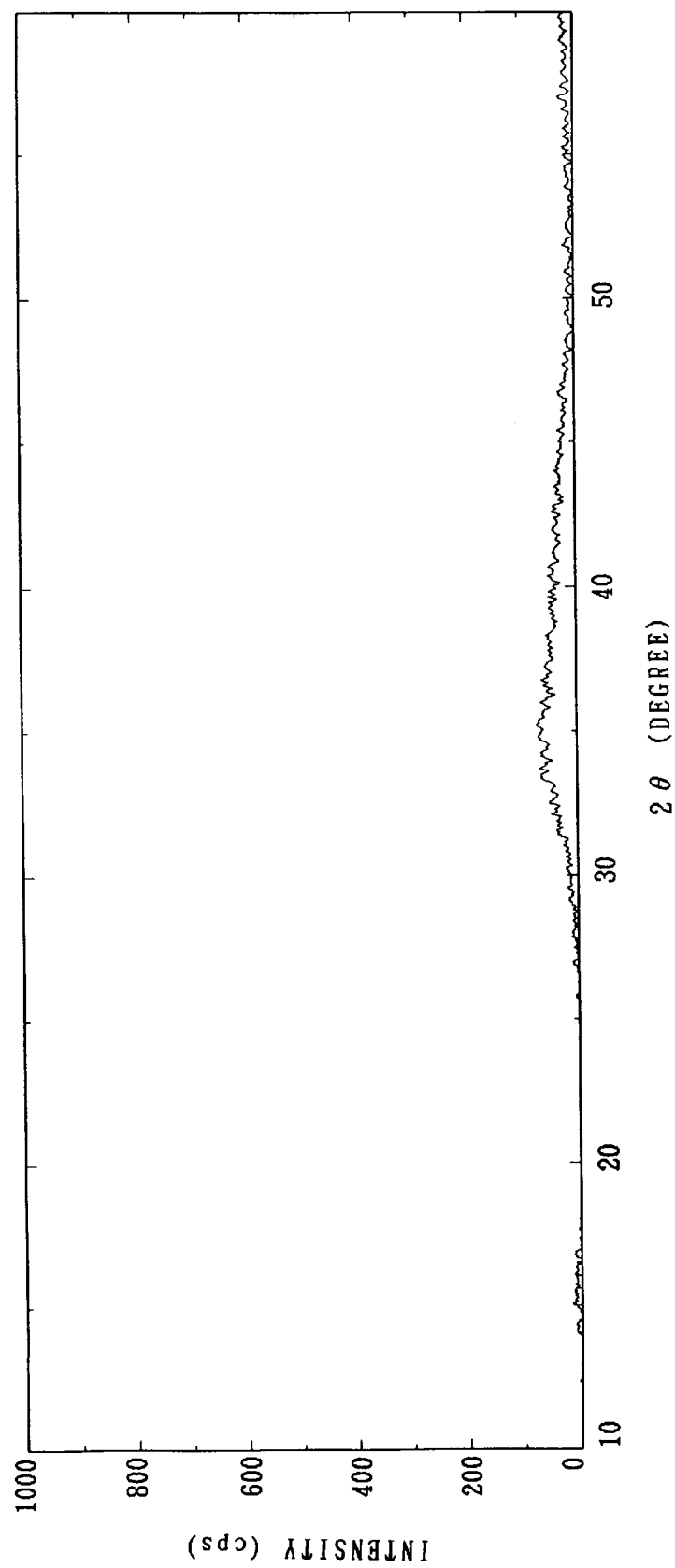
FIG. 11 is an X-ray diffraction diagram of particles of basic nickel carbonate obtained in Example 14.
Figure 12:
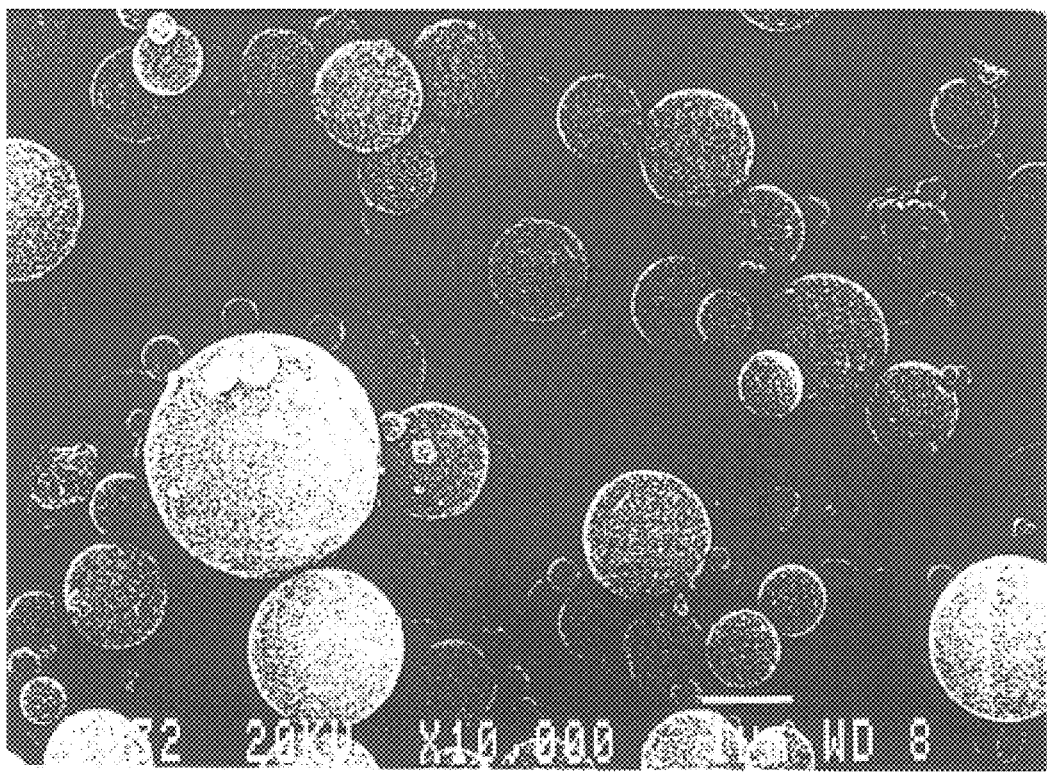
FIG. 12 is a scanning electron micrograph of particles of basic nickel carbonate obtained in Example 14.

It was confirmed by an X-ray diffraction diagram shown in FIG. 11 that the obtained particles were composed of basic nickel carbonate. FIG. 12 is a scanning electron micrograph of the particles of the basic nickel carbonate.

Example 15

141 g of commercially available basic nickel carbonate and 662 g of 50% aqueous solution of triethylamine were added to 15% aqueous ammonia and stirred to prepare an aqueous ammonia-triethylamine solution of basic nickel carbonate (1.1 mol/L in terms of Ni) having a pH of 9.5. In the same manner as in Example 1, spherical particles of basic nickel carbonate having a particle size of 0.1 to 15 μm and an average particle size of 2.2 μm were obtained.

Example 16

141 g of commercially available basic nickel carbonate and 331 g of ethanolamine were added to 15% aqueous ammonia and stirred to prepare an aqueous ammonia-ethanolamine solution of basic nickel carbonate (1.1 mol/L in terms of Ni) having a pH of 9.5. In the same manner as in Example 1, spherical particles of basic nickel carbonate having a particle size of 0.1 to 20 μm and an average particle size of 2.1 μm were obtained.

Example 17

141 g of commercially available basic nickel carbonate and 331 g of diethanolamine were added to 15% aqueous ammonia and stirred to prepare an aqueous ammonia-diethanolamine solution of basic nickel carbonate (1.1 mol/L in terms of Ni) having a pH of 9.5. In the same manner as in Example 1, spherical particles of basic nickel carbonate having a particle size of 0.1 to 13 μm and an average particle size of 3.2 μm were obtained.

Example 18

141 g of commercially available basic nickel carbonate and 331 g of triethanolamine were added to 15% aqueous ammonia and stirred to prepare an aqueous ammonia-triethanolamine solution of basic nickel carbonate (1.1 mol/L in terms of Ni) having a pH of 9.5. In the same manner as in Example 1, spherical particles of basic nickel carbonate having a particle size of 0.1 to 20 μm and an average particle size of 3.5 μm were obtained.

Example 19

104 g of commercially available nickel hydroxide and 331 g of ammonium hydrogencarbonate were added to 15% aqueous ammonia and stirred to prepare an aqueous ammonia-ammonium hydrogencarbonate solution of nickel hydroxide (1.1 mol/L in terms of Ni) having a pH of 9.5. In the same manner as in Example 1, spherical particles of basic nickel carbonate having a particle size of 0.1 to 15 μm and an average particle size of 4.0 μm were obtained.

Figure 13:
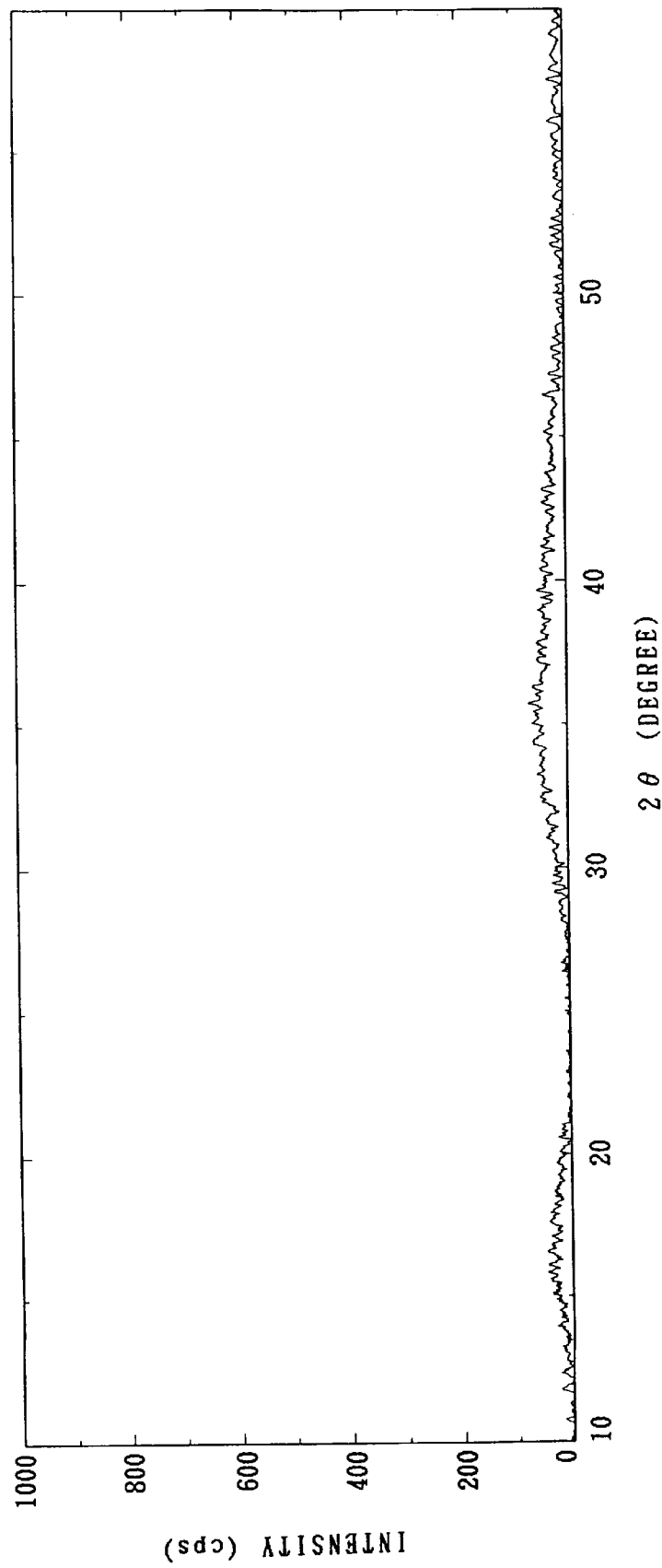
FIG. 13 is an X-ray diffraction diagram of particles of basic nickel carbonate obtained in Example 19.
Figure 14:
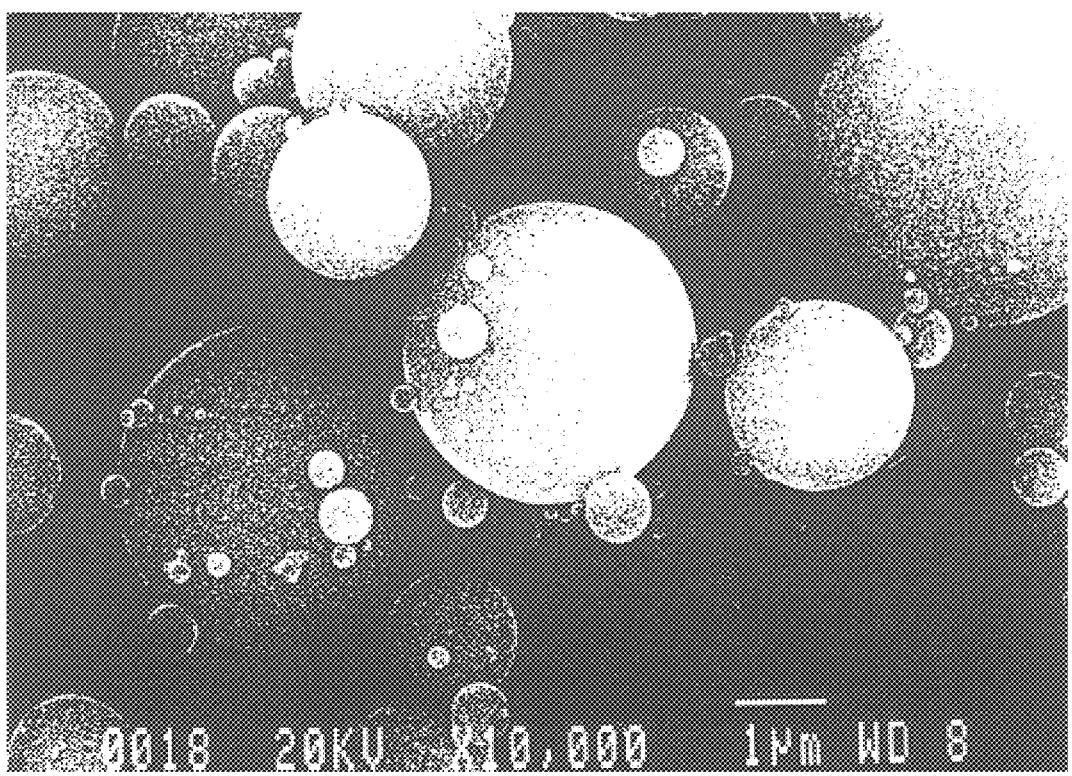
FIG. 14 is a scanning electron micrograph of particles of basic nickel carbonate obtained in Example 19.

It was confirmed by an X-ray diffraction diagram shown in FIG. 13 that the obtained particles were composed of basic nickel carbonate. FIG. 14 is a scanning electron micrograph of the particles of the basic nickel carbonate.

Example 20

104 g of commercially available nickel hydroxide were added to 15% aqueous ammonia and stirred to prepare an aqueous ammonia solution of nickel hydroxide (0.2 mol/L in terms of Ni) having a pH of 9.5. In the same manner as in Example 1, spherical particles of nickel hydroxide having a particle size of 0.1 to 39 μm and an average particle size of 6.3 μm were obtained.

Figure 15:
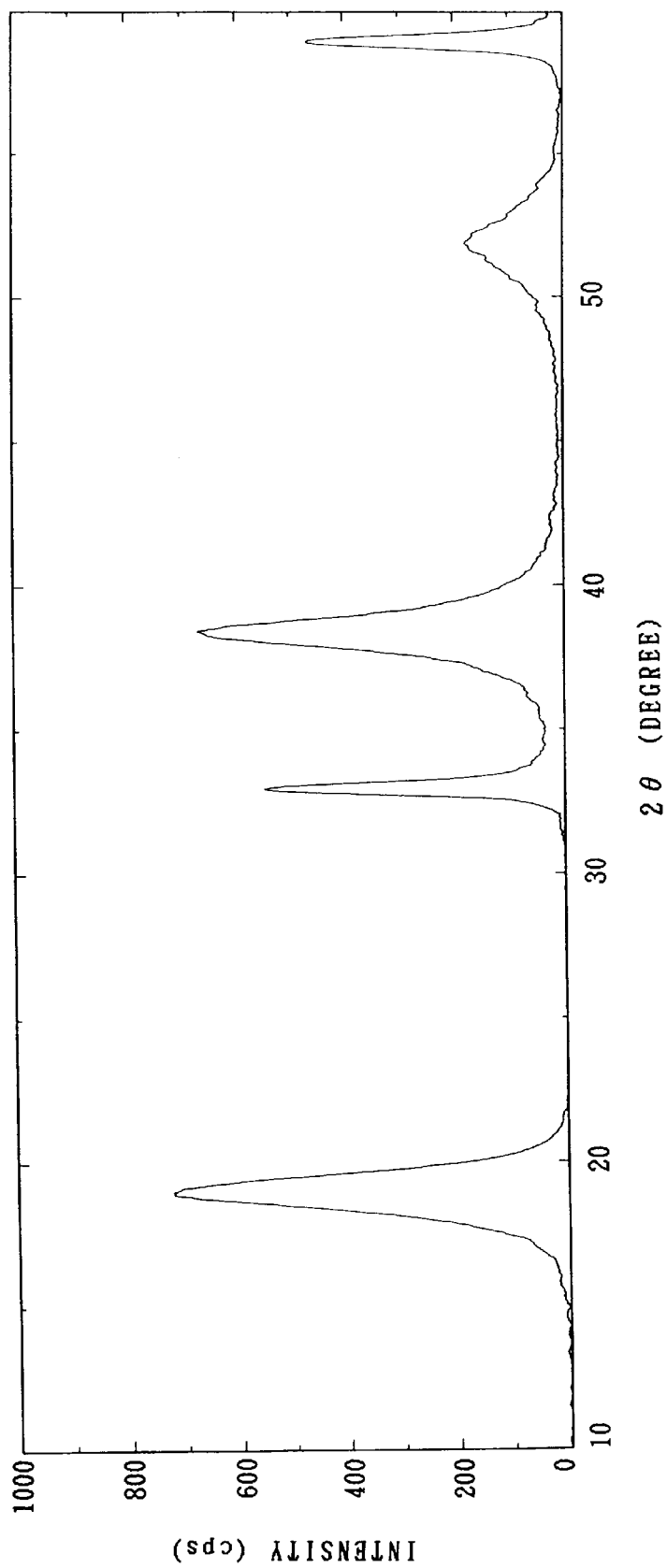
FIG. 15 is an X-ray diffraction diagram of particles of basic nickel carbonate obtained in Example 20.
Figure 16:
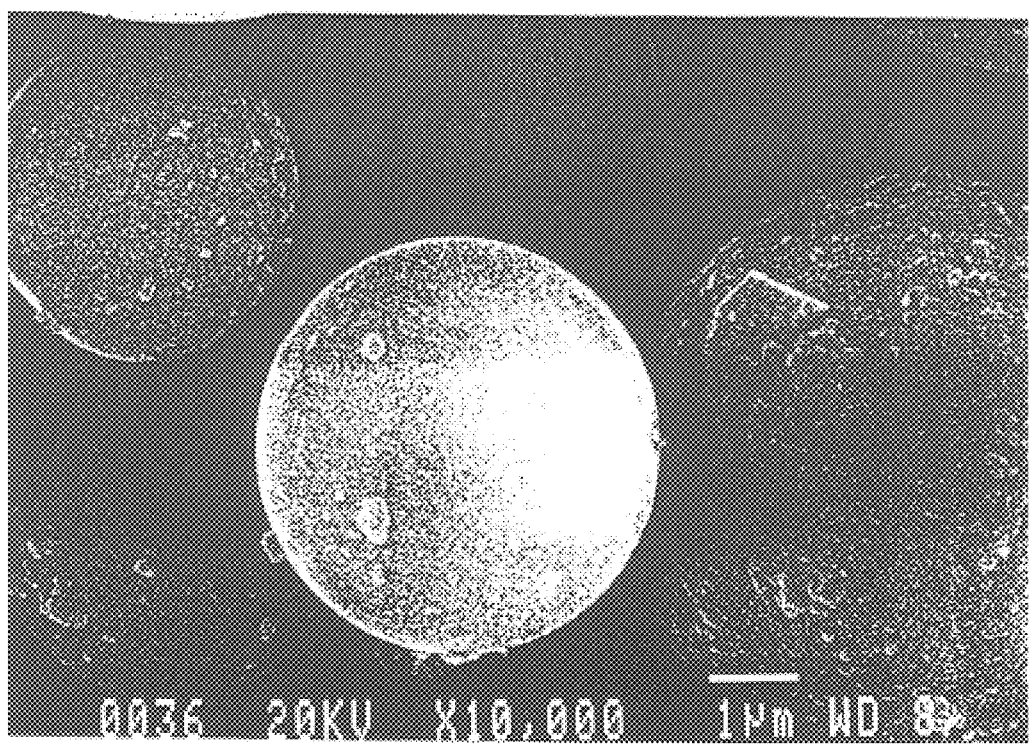
FIG. 16 is a scanning electron micrograph of particles of basic nickel carbonate obtained in Example 20.

It was confirmed by an X-ray diffraction diagram shown in FIG. 15 that the obtained particles were composed of nickel hydroxide. FIG. 16 is a scanning electron micrograph of the particles of the nickel hydroxide.

Example 21

A W/O emulsion was prepared in the same manner as in Example 1. The emulsion was stirred at a temperature of 70° C. under the normal pressure to evaporate volatile components mainly comprising ammonia and carbon dioxide from within the droplets of the solution, thereby to precipitate basic nickel carbonate in the droplet in the emulsion. Then, the emulsion was further stirred and volatile components mainly comprising water were evaporated from within the droplets, thereby drying the particles of basic nickel carbonate thus formed in the emulsion. The basic nickel carbonate thus formed was centrifuged, washed with hexane, methanol and water in this order, and dried at a temperature of 100° C. for 2 hours, to provide spherical particles of basic nickel carbonate having a particle size of 0.1 to 25 μm and an average particle size of 4.3 μm were obtained.

Example 22

A W/O emulsion was prepared in the same manner as in Example 2. The emulsion was stirred at a temperature of 70° C. under the normal pressure to evaporate volatile components mainly comprising ammonia and carbon dioxide from within the droplets of the solution, thereby to precipitate basic nickel carbonate in the droplet in the emulsion. Then, the emulsion was further stirred and volatile components mainly comprising water were evaporated from within the droplets, thereby drying the particles of basic nickel carbonate thus formed in the emulsion. The basic nickel carbonate thus formed was centrifuged, washed with hexane, methanol and water in this order, and dried at a temperature of 100° C. for 2 hours, to provide spherical particles of basic nickel carbonate having a particle size of 0.1 to 13 μm and an average particle size of 3.0 μm were obtained.

Figure 17:
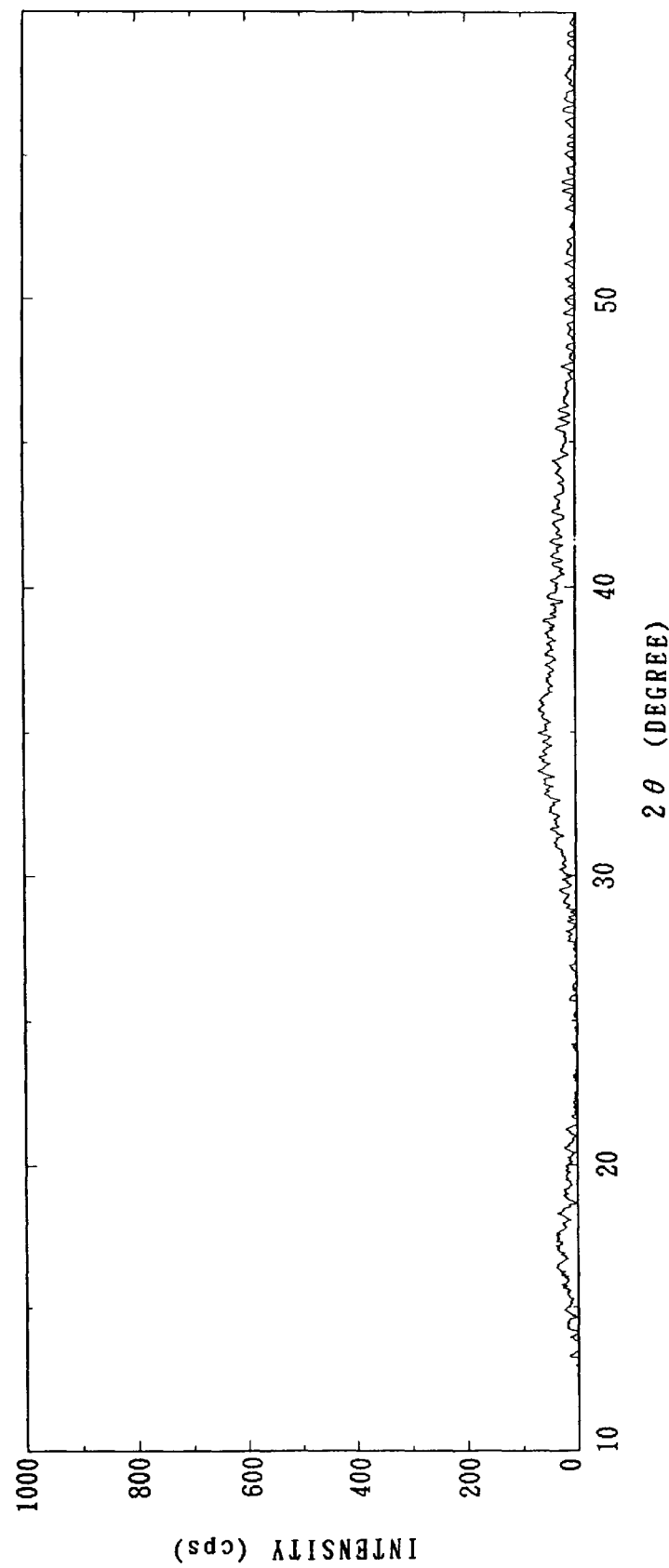
FIG. 17 is an X-ray diffraction diagram of particles of basic nickel carbonate obtained in Example 22.
Figure 18:
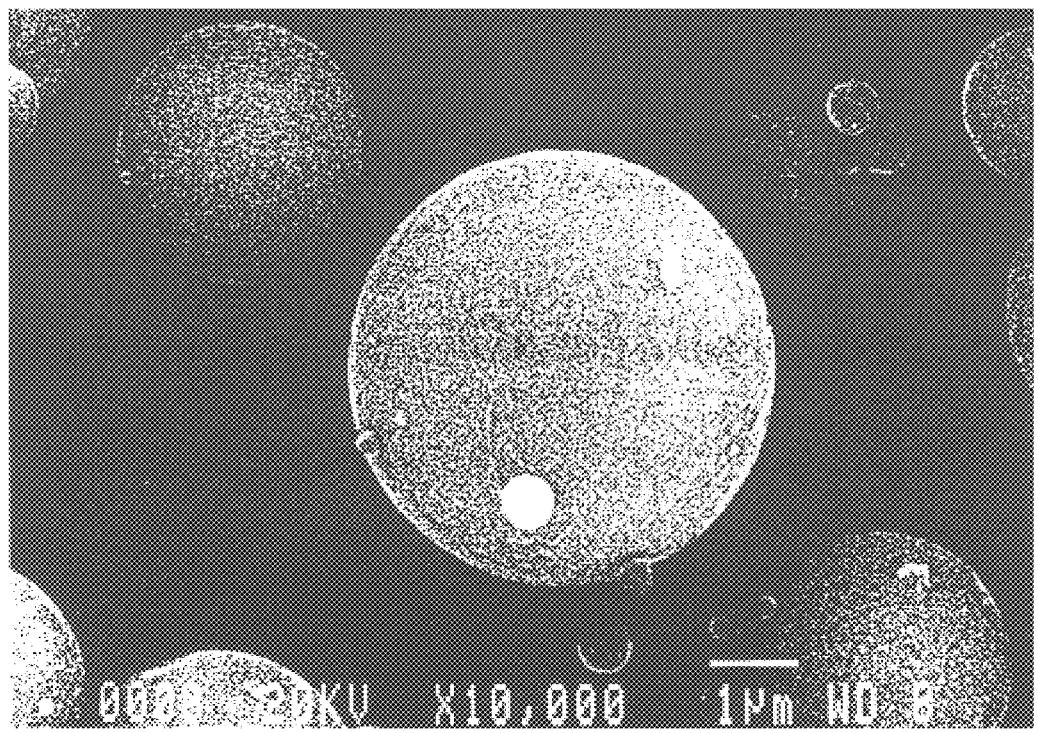
FIG. 18 is a scanning electron micrograph of particles of basic nickel carbonate obtained in Example 22.

It was confirmed by an X-ray diffraction diagram shown in FIG. 17 that the obtained particles were composed of basic nickel carbonate. FIG. 18 is a scanning electron micrograph of the particles of the basic nickel carbonate.

Example 23

A W/O emulsion was prepared in the same manner as in Example 5. The emulsion was stirred at a temperature of 70° C. under the normal pressure to evaporate volatile components mainly comprising ammonia and carbon dioxide from within the droplets of the solution, thereby to precipitate basic nickel carbonate in the droplet in the emulsion. Then, the emulsion was further stirred and volatile components mainly comprising water were evaporated from within the droplets, thereby drying the particles basic nickel carbonate thus formed in the emulsion. The basic nickel carbonate thus formed was centrifuged, washed with hexane, methanol and water in this order, and dried at a temperature of 100° C. for 2 hours, to provide spherical particles of basic nickel carbonate having a particle size of 0.1 to 15 μm and an average particle size of 2.5 μm were obtained.

Example 24

A W/O emulsion was prepared in the same manner as in Example 14. The emulsion was stirred at a temperature of 70° C. under the normal pressure to evaporate volatile components mainly comprising ammonia from within the droplets in the solution, thereby to precipitate basic nickel carbonate in the droplet in the emulsion. Then, the emulsion was further stirred and volatile components mainly comprising water were evaporated from within the droplets, thereby drying the particles of basic nickel carbonate thus formed in the emulsion. The basic nickel carbonate was centrifuged, washed with hexane, methanol and water in this order, and dried at a temperature of 100° C. for 2 hours, to provide spherical particles of basic nickel carbonate having a particle size of 0.1 to 10 μm and an average particle size of 2.3 μm were obtained.

Example 25

A W/O emulsion was prepared in the same manner as in Example 20. The emulsion was stirred at a temperature of 70° C. under the normal pressure to evaporate volatile components mainly comprising ammonia from within the droplets in the solution, thereby to precipitate nickel hydroxide in the droplet in the emulsion. Then, the emulsion was further stirred and volatile components mainly comprising water were evaporated from within the droplets, thereby drying the particles of nickel hydroxide thus formed in the droplets in the emulsion. The nickel hydroxide thus obtained was centrifuged, washed with hexane, methanol and water in this order, and dried at a temperature of 100° C. for 2 hours, to provide spherical particles of nickel hydroxide having a particle size of 0.1 to 15 μm and an average particle size of 2.8 μm were obtained.

Example 26

A W/O emulsion was prepared in the same manner as in Example 1. Suction was applied to the emulsion at a temperature of 50° C. under a reduced pressure of 100 mmHg to evaporate volatile components mainly comprising ammonia and carbon dioxide from within the droplets in the solution, thereby to precipitate basic nickel carbonate in the droplet in the emulsion. Then, the emulsion was further stirred and volatile components mainly comprising water were evaporated from within the droplets, thereby drying the particles of basic nickel carbonate thus formed in the droplets in the emulsion. The basic nickel carbonate thus obtained was centrifuged, washed with hexane, methanol and water in this order, and dried at a temperature of 100° C. for 2 hours, to provide spherical particles of basic nickel carbonate having a particle size of 0.1 to 13 μm and an average particle size of 2.2 μm were obtained.

Example 27

A W/O emulsion was prepared in the same manner as in Example 1. Suction was applied to the emulsion at a temperature of 50° C. under a reduced pressure of 150 mmHg to evaporate volatile components mainly comprising ammonia and carbon dioxide from within the droplets in the solution, thereby to precipitate basic nickel carbonate in the droplets in the emulsion. Then, the emulsion was further stirred and volatile components mainly comprising water were evaporated from within the droplets, thereby drying the particles of basic nickel carbonate thus formed in the droplets in the emulsion. The basic nickel carbonate was centrifuged, washed with hexane, methanol and water in this order, and dried at a temperature of 100° C. for 2 hours, to provide spherical particles of basic nickel carbonate having a particle size of 0.1 to 20 μm and an average particle size of 3.0 μm were obtained.

Example 28

A W/O emulsion was prepared in the same manner as in Example 1. Suction was applied to the emulsion at a temperature of 50° C. under a reduced pressure of 200 mmHg to evaporate volatile components mainly comprising ammonia and carbon dioxide from within the droplets in the solution, thereby to precipitate basic nickel carbonate in the droplets in the emulsion. Then, the emulsion was further stirred and volatile components mainly comprising water were evaporated from within the droplets, thereby drying the particles of basic nickel carbonate thus formed in the droplets in the emulsion. The basic nickel carbonate was centrifuged, washed with hexane, methanol and water in this order, and dried at a temperature of 100° C. for 2 hours, to provide spherical particles of basic nickel carbonate having a particle size of 0.1 to 20 μm and an average particle size of 2.8 μm were obtained.

Example 29

A W/O emulsion was prepared in the same manner as in Example 1. The emulsion was aerated at a temperature of 50° C. under the normal pressure while being stirred to evaporate volatile components mainly comprising ammonia and carbon dioxide from within the droplets in the solution, thereby to precipitate basic nickel carbonate in the droplets in the emulsion. Then, the emulsion was further stirred and volatile components mainly comprising water were evaporated from within the droplets, thereby drying the particles of basic nickel carbonate thus formed in the droplets in the emulsion. The basic nickel carbonate was centrifuged, washed with hexane, methanol and water in this order, and dried at a temperature of 100° C. for 2 hours, to provide spherical particles of basic nickel carbonate having a particle size of 0.1 to 18 μm and an average particle size of 2.5 μm were obtained.

Example 30

A W/O emulsion was prepared in the same manner as in Example 1. Nitric acid (2 mol/L) was added dropwise to the W/O emulsion over 3 hours to gradually neutralize the emulsion, thereby to precipitate basic nickel carbonate in the droplets in the emulsion. The precipitates were collected by filtration, washed with hexane, methanol and water in this order, and dried at a temperature of 100° C. for 2 hours, to provide spherical particles of basic nickel carbonate having a particle size of 0.1 to 15 μm and an average particle size of 1.5 μm.

Example 31

A W/O emulsion was prepared in the same manner as in Example 2. Nitric acid (2 mol/L) was added dropwise to the W/O emulsion over 3 hours to gradually neutralize the emulsion, thereby to precipitate basic nickel carbonate in the droplets. The precipitates were collected by filtration, washed with hexane, methanol and water in this order, and dried at a temperature of 100° C. for 2 hours, to provide spherical particles of basic nickel carbonate having a particle size of 0.1 to 13 μm and an average particle size of 1.3 μm.

Example 32

A W/O emulsion was prepared in the same manner as in Example 5. Nitric acid (2 mol/L) was added dropwise to the W/O emulsion over 3 hours to gradually neutralize the emulsion, thereby to precipitate basic nickel carbonate in the droplets. The precipitates were collected by filtration, washed with hexane, methanol and water in this order, and dried at a temperature of 100° C. for 2 hours, to provide spherical particles of basic nickel carbonate having a particle size of 0.1 to 20 μm and an average particle size of 1.8 μm.

Example 33

A W/O emulsion was prepared in the same manner as in Example 14. Nitric acid (2 mol/L) was added dropwise to the W/O emulsion over 3 hours to gradually neutralize the emulsion, thereby to precipitate basic nickel carbonate in the droplets. The precipitates were collected by filtration, washed with hexane, methanol and water in this order, and dried at a temperature of 100° C. for 2 hours, to provide spherical particles of basic nickel carbonate having a particle size of 0.1 to 7 μm and an average particle size of 2.3 μm.

Figure 19:
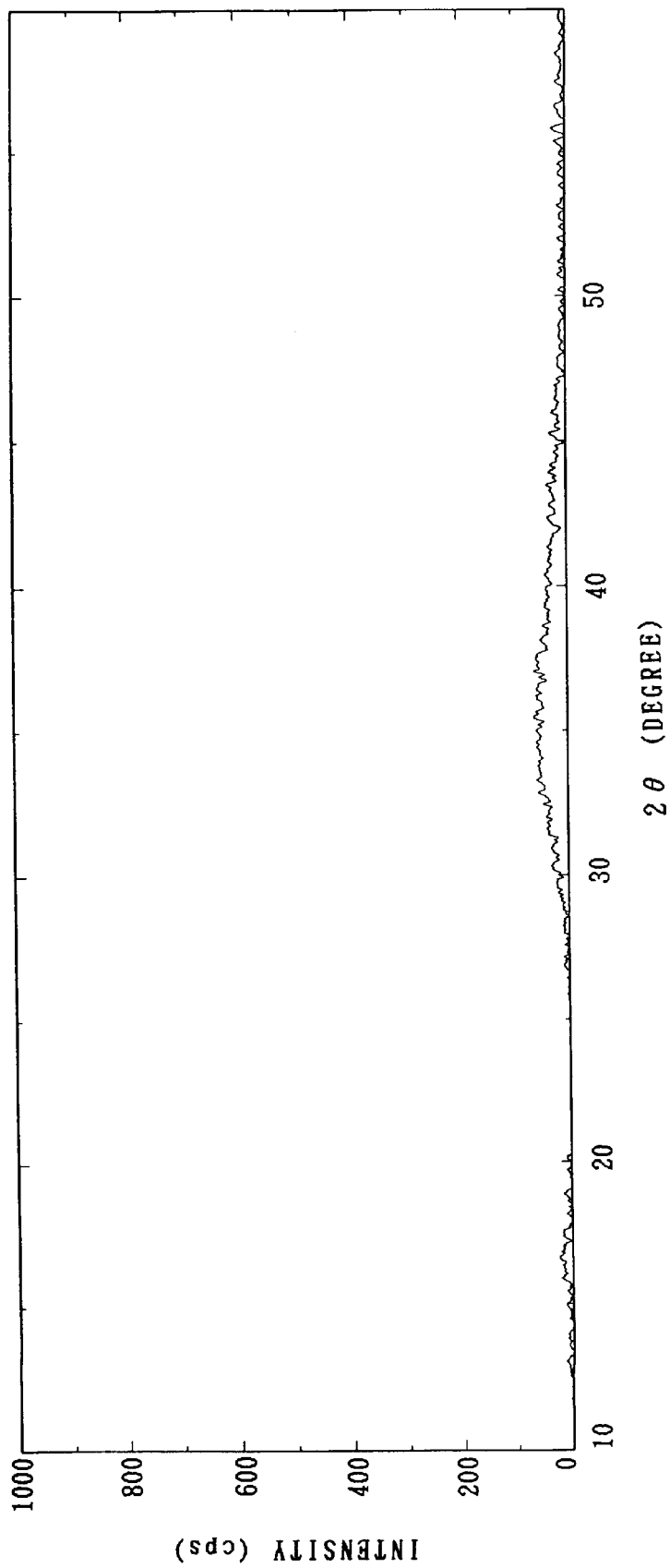
FIG. 19 is an X-ray diffraction diagram of particles of basic nickel carbonate obtained in Example 33.
Figure 20:
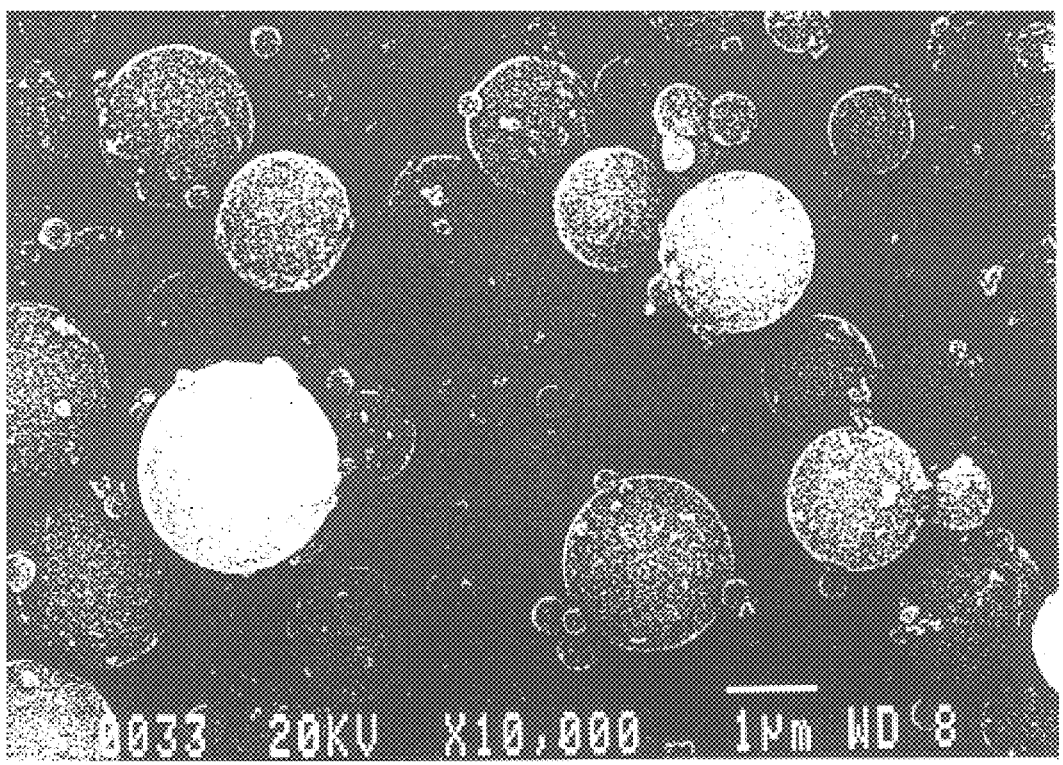
FIG. 20 is a scanning electron micrograph of particles of basic nickel carbonate obtained in Example 33.

It was confirmed by an X-ray diffraction diagram shown in FIG. 19 that the obtained particles were composed of basic nickel carbonate. FIG. 20 is a scanning electron micrograph of the particles of the basic nickel carbonate.

Example 34

A W/O emulsion was prepared in the same manner as in Example 20. Nitric acid (2 mol/L) was added dropwise to the W/O emulsion over 3 hours to gradually neutralize the emulsion, thereby to precipitate nickel hydroxide the droplets. The precipitates were collected by filtration, washed with hexane, methanol and water in this order, and dried at a temperature of 100° C. for 2 hours, to provide spherical particles of nickel hydroxide having a particle size of 0.1 to 40 μm and an average particle size of 7.5 μm.

Figure 21:
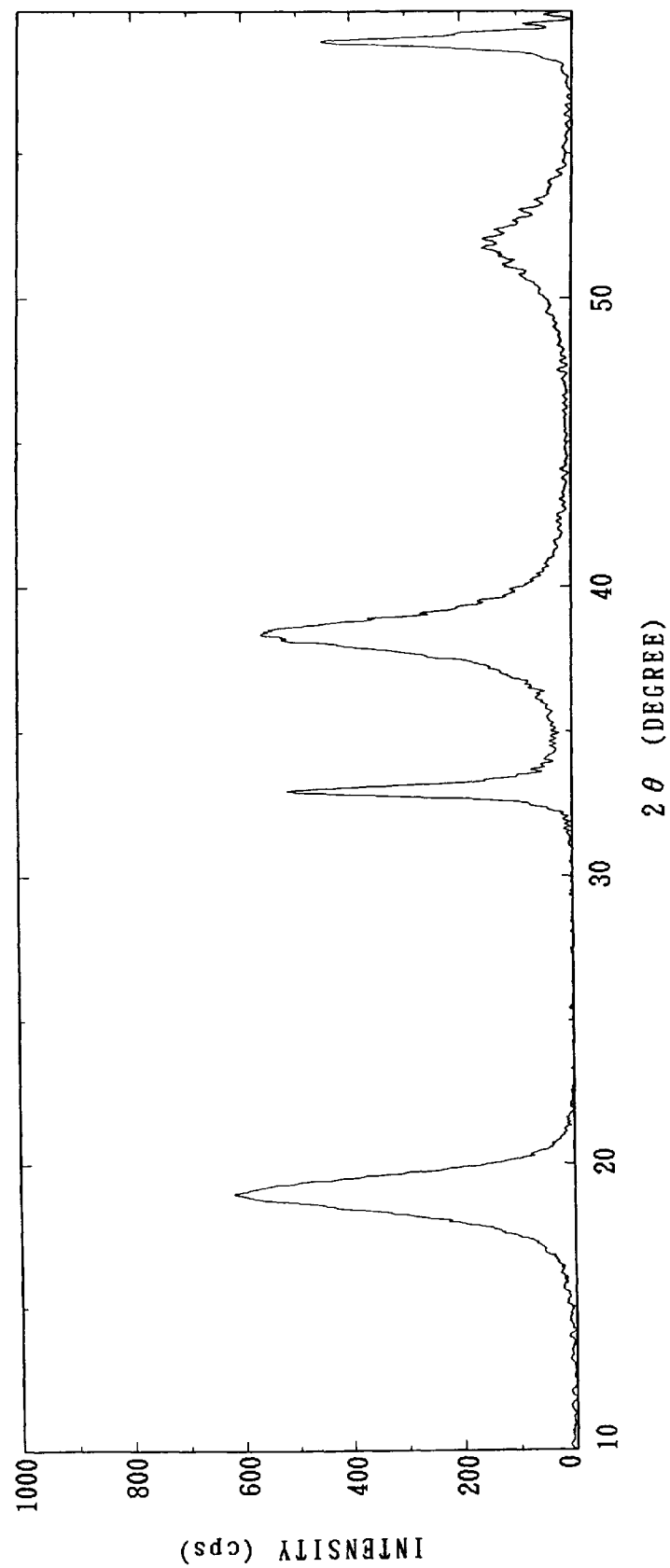
FIG. 21 is an X-ray diffraction diagram of particles of basic nickel carbonate obtained in Example 34.
Figure 22:
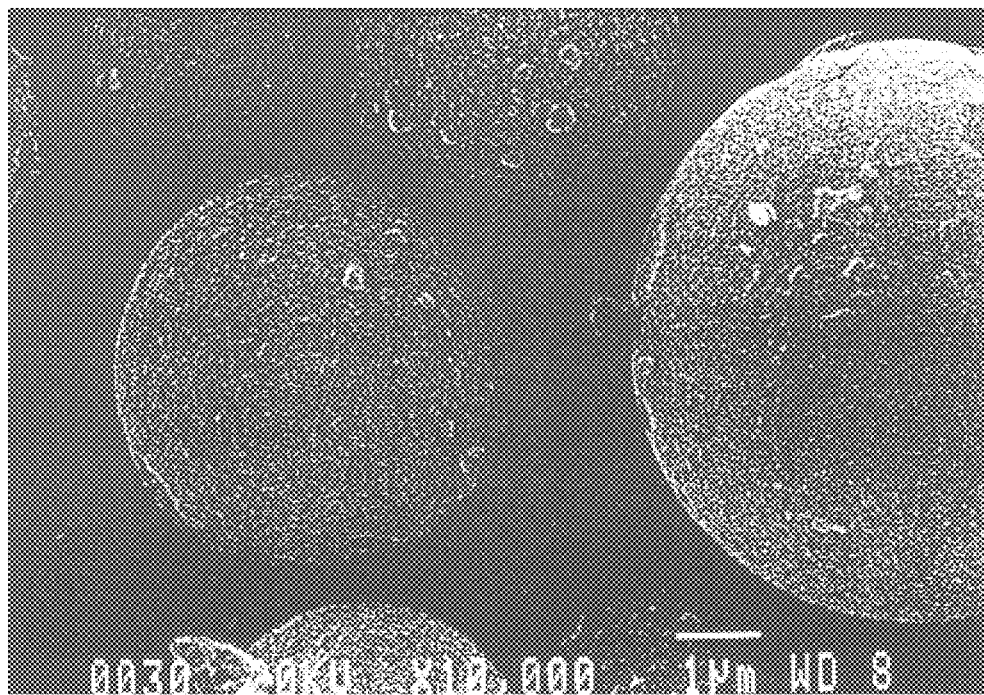
FIG. 22 is a scanning electron micrograph of particles of basic nickel carbonate obtained in Example 34.

It was confirmed by an X-ray diffraction diagram shown in FIG. 21 that the obtained particles were composed of nickel hydroxide. FIG. 22 is a scanning electron micrograph of the particles of the nickel hydroxide.

Example 35

106 g of commercially available basic copper carbonate ($CuCO_3 \cdot Cu(OH)_2 \cdot H_2O$) were added to 15% aqueous ammonia and stirred to prepare an aqueous ammonia solution of basic copper carbonate (0.8 mol/L in terms of Cu) having a pH of 10.2. In the same manner as in Example 1, spherical particles of basic copper carbonate having a particle size of 0.1 to 30 μm and an average particle size of 7.2 μm were obtained.

Figure 23:
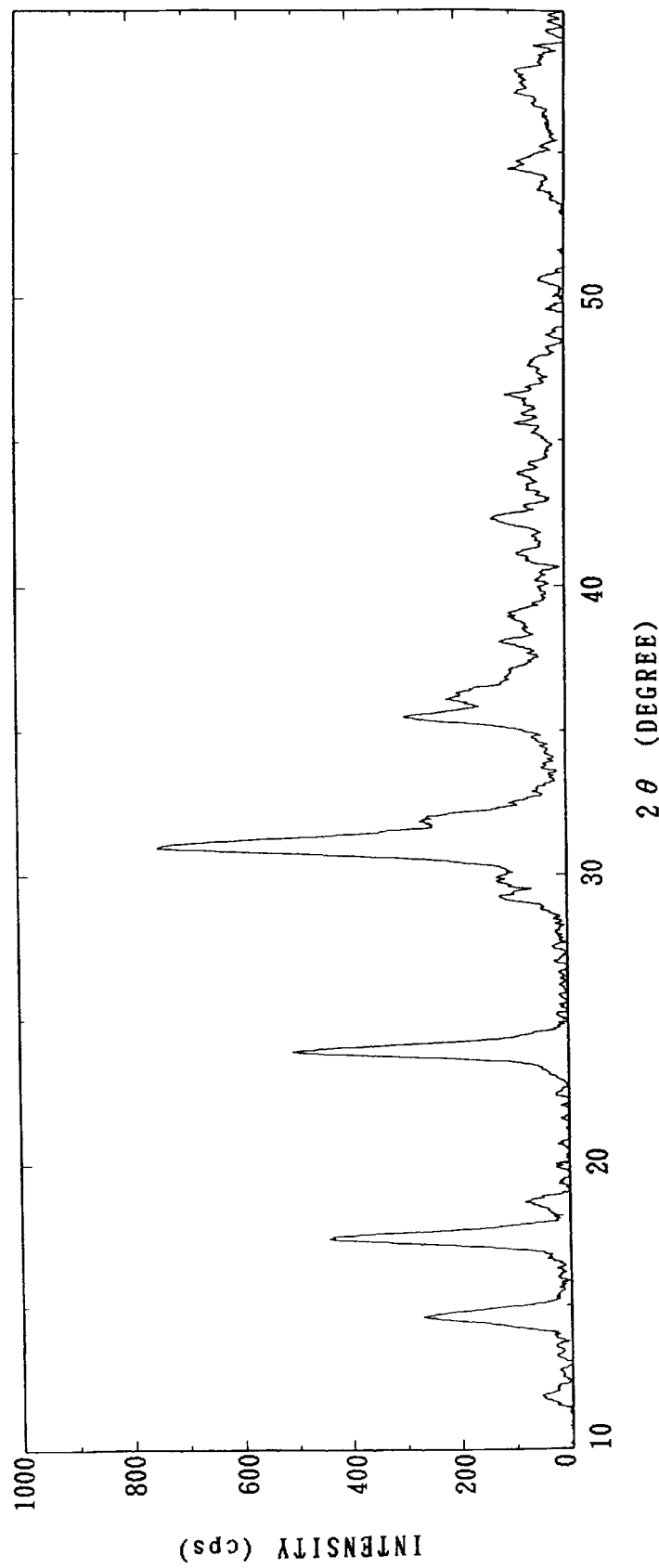
FIG. 23 is an X-ray diffraction diagram of particles of basic copper carbonate obtained in Example 35.
Figure 24:
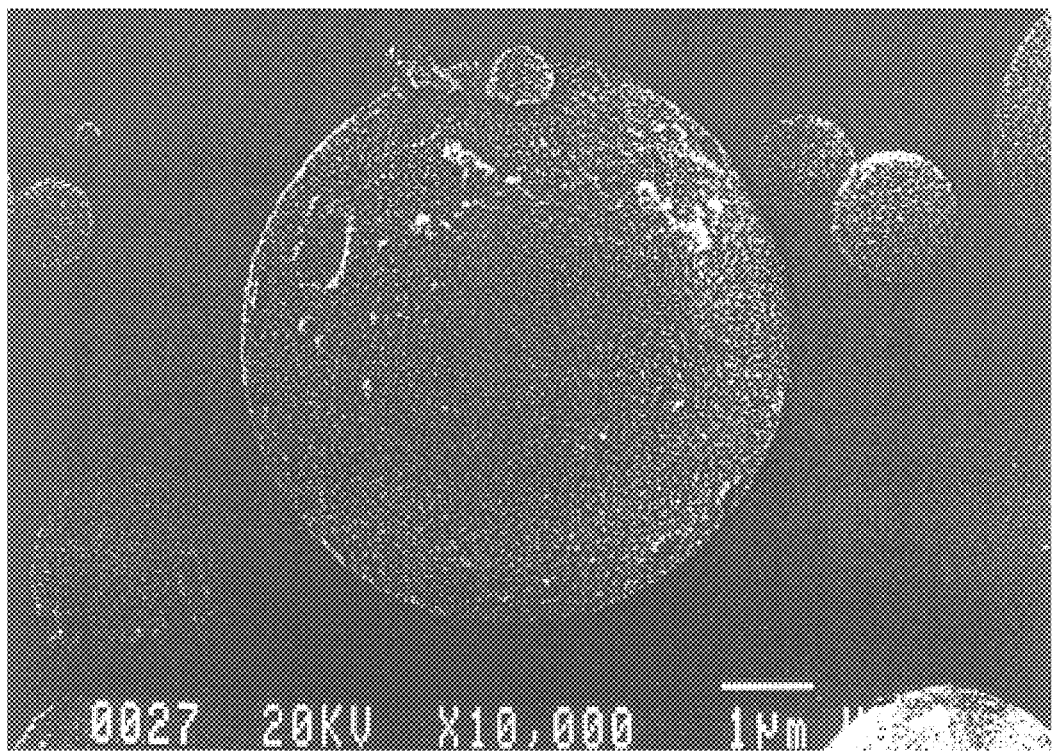
FIG. 24 is a scanning electron micrograph of particles of basic copper carbonate obtained in Example 35.

It was confirmed by an X-ray diffraction diagram shown in FIG. 23 that the obtained particles were composed of basic copper carbonate. FIG. 24 is a scanning electron micrograph of the particles of the basic copper carbonate.

Example 36

302 g of commercially available basic cobalt carbonate ($CoCO_3 \cdot 3/2Co(OH)_2$) were added to 15% aqueous ammonia anD stirred to prepare an aqueous ammonia solution of basic cobalt carbonate (0.8 mol/L in terms of Co) having a pH of 9.8. In the same manner as in Example 1, spherical particles of basic cobalt carbonate having a particle size of 0.1 to 18 μm and an average particle size of 4.2 μm were obtained.

Figure 25:
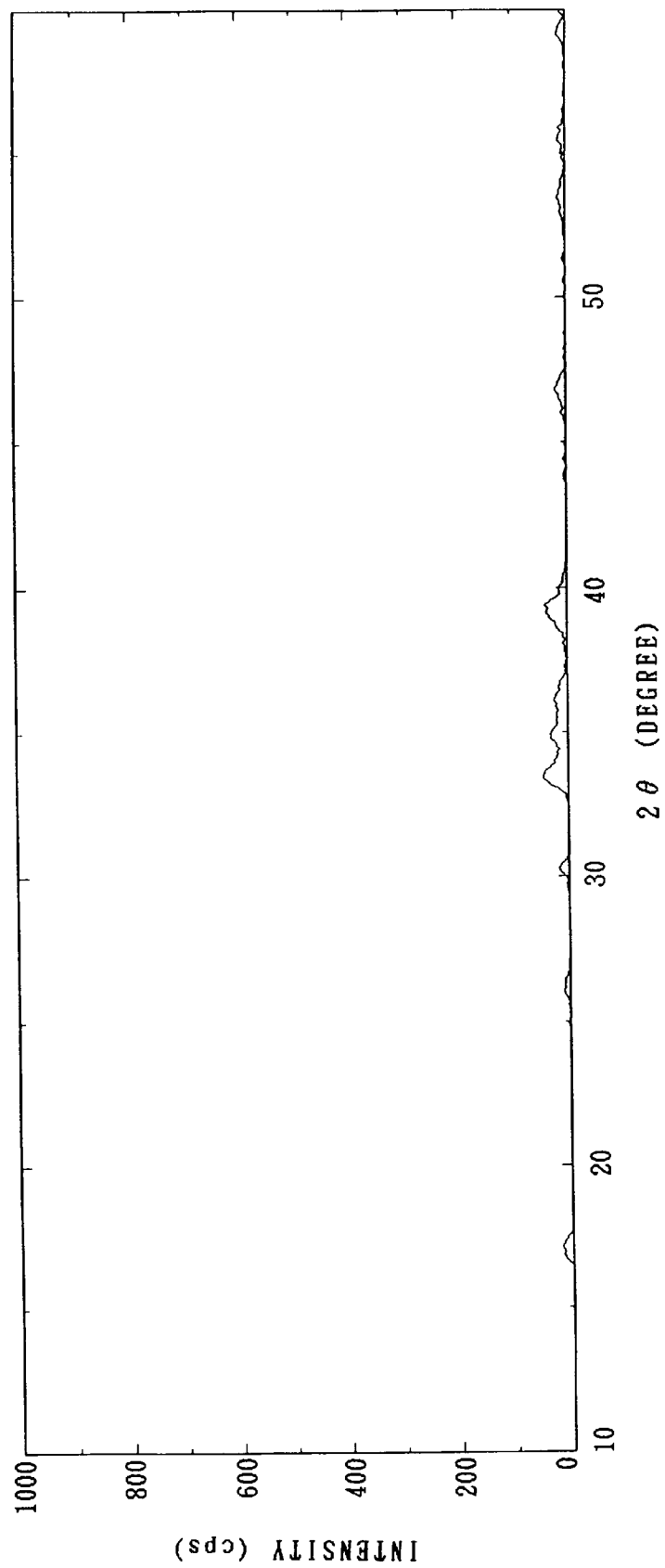
FIG. 25 is an X-ray diffraction diagram of particles of basic cobalt carbonate obtained in Example 36.
Figure 26:
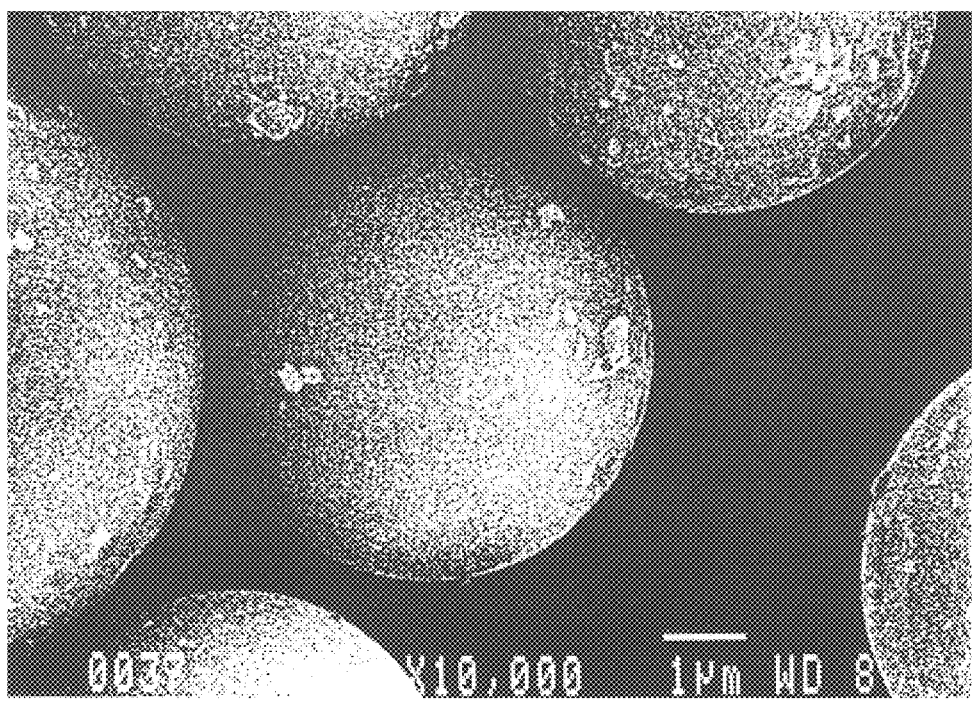
FIG. 26 is a scanning electron micrograph of particles of basic cobalt carbonate obtained in Example 36.

It was confirmed by an X-ray diffraction diagram shown in FIG. 25 that the obtained particles were composed of basic cobalt carbonate. FIG. 26 is a scanning electron micrograph of the particles of the basic cobalt carbonate.

Example 37

141 g of commercially available basic nickel carbonate and 242 g of ammonium hydrogencarbonate were added to 15% aqueous ammonia and stirred to prepare an aqueous ammoni-ammonium hydrogencarbonate solution of basic nickel carbonate (1.1 mol/L in terms of Ni) having a pH of 9.5.

30 g of a nonionic surfactant, polyoxyethylene sorbitan monooleate having an HLB value of 15 (RHEODOL TW-0120, available from Kao Corp.) was added to 200 g of the solutioN of nickel salt and stirred at 50° C. to dissolve the surfactant in the solution. Meanwhile, 50 g of a nonionic surfactant, sorbitan monooleate having an HLB value of 4.3 (RHEODOL SP010, available from Kao Corp.) were added at a temperature of 80° C. to 800 g of a non-aqueous medium, squalan (Super Squalane, available from K.K. Squatech) having a boiling point of about 280° C. to dissolve the surfactant in the non-aqueous medium.

The aqueous solution of the nickel salt in which the surfactant was dissolved was mixed with the non-aqueous medium in which the surfactant was dissolved and the resulting mixture was stirred for 5 minutes using a homomixer (available from Tokushu Kika Kogyo K.K.) at 5000 rpm twice to prepare a W/O emulsion.

Suction was applied to the emulsion under a reduced pressure of 20 to 30 mmHg at a temperature of 50° C. and volatile components mainly comprising ammonia and carbon dioxide were evaporated to precipitate basic nickel carbonate in the droplets of the solution in the emulsion. Thereafter, further suction was applied to the emulsion under a reduced pressure to evaporate volatile components mainly comprising water to dry the spherical particles of the nickel carbonate in the emulsion.

Figure 27:
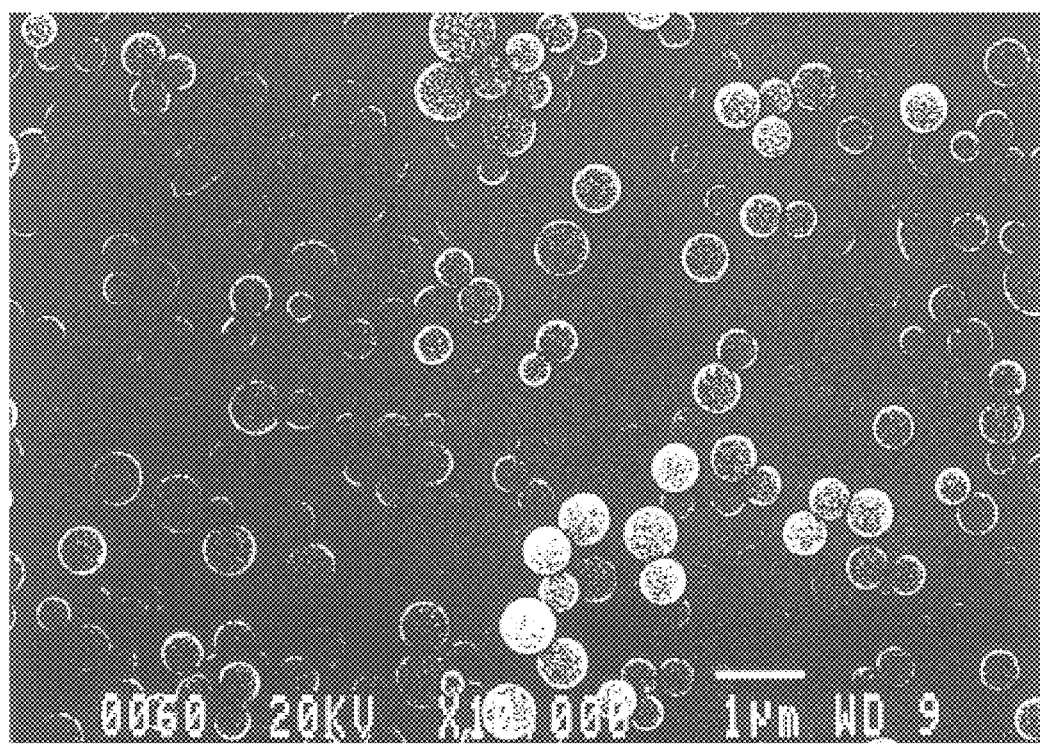
FIG. 27 is a scanning electron micrograph of particles of basic nickel carbonate obtained in Example 37.

The particle of the basic nickel carbonate were centrifuged, washed with hexane, methanol and water in this order, and dried at a temperature of 100° C. for 2 hours, thereby providing spherical particles of basic nickel carbonate having a particle size of 0.2 to 1 μm and an average particle size of 0.5 μm. FIG. 27 is a particle size distribution diagram of the particles of the basic nickel carbonate thus obtained.

What is claimed is:

1. A process for production of fine spherical particles of a carbonate or a hydroxide of nickel, cobalt or copper which comprises: dissolving a carbonate or a hydroxide of nickel, cobalt or copper having the general formula (I)

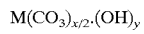

$$M(CO_3)_{x/2} \cdot (OH)_y$$

wherein M represents Ni, Co or Cu, and x and y are numerals satisfying the followings: $0 \leq x \leq 2$, $0 \leq y \leq 2$ and $x+y=2$, in aqueous ammonia, converting the resulting solution to a W/O emulsion containing droplets of the solution in a non-aqueous medium, and then removing volatile components including ammonia from within the droplets, thereby precipitating a basic carbonate or a hydroxide of nickel, cobalt or copper in the droplets.

2. The process as claimed in claim 1 wherein volatile components containing ammonia are evaporated from within the droplets in the emulsion to precipitate a carbonate or a hydroxide of nickel, cobalt or copper in the droplets.

3. The process as claimed in claim 1 wherein the droplets are neutralized with an acid to precipitate a carbonate or a hydroxide of nickel, cobalt or copper in the droplets.

4. The process as claimed in claim 1 wherein the aqueous ammonia contains a second basic compound other than ammonia.

5. The process as claimed in claim 4 wherein the second basic compound is ammonium carbonate or ammonium hydrogencarbonate.

6. The process as claimed in claim 4 wherein the second basic compound is a carbonate, a hydrogencarbonate or a hydroxide of an alkali metal.

7. The process as claimed in claim 6 wherein the alkali metal is lithium, potassium or sodium.

8. The process as claimed in claim 4 wherein the second basic compound is an organic amine.

9. The process as claimed in claim 8 wherein the organic amine is a mono-, di- or trialkylamine.

10. The process as claimed in claim 8 wherein the organic amine is a mono-, di- or trialkanolamine.

11. The process according to any one of claims 1 to 10 which comprises: dissolving nickel carbonate, cobalt carbonate or copper carbonate either in aqueous ammonia or in aqueous ammonia containing a second basic compound other than ammonia, dispersing the solution in a non-aqueous medium in the form of droplets of the solution to prepare a W/O emulsion, and then removing volatile components containing ammonia from within the droplets, thereby precipitating a carbonate of nickel, cobalt or copper in the droplets.

12. The process according to any one of claims 1 to 10 which comprises: dissolving nickel hydroxide, cobalt hydroxide or copper hydroxide in aqueous ammonia containing ammonium carbonate, ammonium hydrogencarbonate or, a carbonate or a hydrogencarbonate of an alkali metal, dispersing the resulting solution in a non-aqueous medium in the form of droplets of the solution to prepare a W/O emulsion, and then removing volatile components containing ammonia from within the droplets, thereby precipitating a carbonate of nickel, cobalt or copper in the droplets.

13. The process according to any one of claims 1 to 10 which comprises: dissolving nickel hydroxide, cobalt hydroxide or copper hydroxide in aqueous ammonia, dispersing the solution in a non-aqueous medium in the form of droplets of the solution to prepare a W/O emulsion, and then removing volatile components containing ammonia from within the droplets, thereby precipitating nickel hydroxide, cobalt hydroxide or copper hydroxide in the droplets.

14. A process for producing fine spherical particles of nickel carbonate which comprises: dissolving nickel carbonate and ammonia in an aqueous solution of ammonium hydrogencarbonate or ammonium carbonate at a pH in the range of 8.0–11.5, mixing the resulting solution with a non-aqueous medium to prepare a W/O emulsion containing droplets of the solution therein, and then evaporating volatile components containing ammonia from within the droplets, thereby precipitating nickel carbonate in the droplets in the emulsion.

* * * * *